US012522760B2

(12) United States Patent
Hernando Campos et al.

(10) Patent No.: US 12,522,760 B2
(45) Date of Patent: Jan. 13, 2026

(54) PHOTOINDUCED THERMOCHROMIC OR THERMOLUMINESCENT COMPOSITION

(71) Applicants:CONSEJO SUPERIOR DE INVESTIGACIONES CIENTÍFICAS (CSIC), Madrid (ES); FUNDACIÓ INSTITUT CATALÁ DE NANOCIÈNCIA I NANOTECNOLOGIA (ICN2), Bellaterra (ES); UNIVERSITAT AUTÒNOMA DE BARCELONA, Bellaterra (ES)

(72) Inventors: Jordi Hernando Campos, Cornellà de Llobregat (ES); Claudio Roscini, Barcelona (ES); Jaume Ramon Otaegui Rabanal, Sant Cugat del Valles (ES); Daniel Ruiz Molina, Sabadell (ES)

(73) Assignees: CONSEJO SUPERIOR DE INVESTIGACIONES CIENTIFICAS (CSIC), Madrid (ES); FUNDACIÓ INSTITUT CATALÁ DE NANOCIENCIA I NANOTECNOLOGIA (ICN2), Bellaterra (ES); UNIVERSITAT AUTÒNOMA DE BARCELONA, Bellaterra (ES)

( * ) Notice: Subject to any disclaimer, the term of this patent is extended or adjusted under 35 U.S.C. 154(b) by 858 days.

(21) Appl. No.: 17/782,621

(22) PCT Filed: Dec. 3, 2020

(86) PCT No.: PCT/EP2020/084371
§ 371 (c)(1),
(2) Date: Jun. 3, 2022

(87) PCT Pub. No.: WO2021/110794
PCT Pub. Date: Jun. 10, 2021

(65) Prior Publication Data
US 2022/0348811 A1     Nov. 3, 2022

(30) Foreign Application Priority Data

Dec. 5, 2019   (EP) .................................... 19383086

(51) Int. Cl.
| C09K 5/06 | (2006.01) |
| C09D 5/22 | (2006.01) |
| C09D 5/29 | (2006.01) |
| C09D 7/41 | (2018.01) |
| C09K 9/02 | (2006.01) |
| C09K 11/02 | (2006.01) |
| C09K 11/06 | (2006.01) |

(52) U.S. Cl.
CPC ................ *C09K 5/063* (2013.01); *C09D 5/22* (2013.01); *C09D 5/29* (2013.01); *C09D 7/41* (2018.01); *C09K 9/02* (2013.01); *C09K 11/02* (2013.01); *C09K 11/06* (2013.01)

(58) Field of Classification Search
CPC .......... C09K 5/063; C09K 9/02; C09K 11/02; C09K 11/06; C09D 5/22; C09D 5/29; C09D 7/41
See application file for complete search history.

(56) References Cited

U.S. PATENT DOCUMENTS

| 2013/0342888 A1 | 12/2013 | Donval et al. |
| 2014/0198143 A1* | 7/2014 | Iftime .................... C09D 11/34 |
| | | 106/31.13 |
| 2016/0376458 A1 | 12/2016 | Kim |
| 2017/0166806 A1* | 6/2017 | Roscini ................ C08K 5/0041 |

FOREIGN PATENT DOCUMENTS

| CN | 103284951 A | 9/2013 |
| CN | 104587474 A | 5/2015 |
| CN | 108392632 A | 8/2018 |
| KR | 2019/0118247 A | 10/2019 |

OTHER PUBLICATIONS

International Search Report and Written Opinion mailed Jan. 28, 2021 for International Application No. PCT/EP2020/084371; 16 pages.

He et al: "Near infrared dye loaded copper sulfide-apoferritin for tumor imaging and photothermal therapy," RSC Advances; Jan. 1, 2018; vol. 8(26), 14268-14279; XP005702469, DOI: 10.1039/C8RA00911B.

* cited by examiner

*Primary Examiner* — Andrew J. Oyer
(74) *Attorney, Agent, or Firm* — Squire Patton Boggs (US) LLP

(57) ABSTRACT

The present invention relates to a photoinduced thermochromic or thermoluminescent composition, comprising: a) nanoparticles capable of absorbing near-infrared (NIR) radiation and converting the NIR radiation into heat, in particular metal gold nanoparticles; b) one or more phase change materials (PCM) selected from the group consisting of: b1) a PCM capable of acting as chromic or fluorochromic promoter; and b2) a PCM uncapable of acting as chromic or fluorochromic promoter; c) one or more dyes selected from the group consisting of: c1) a dye capable of modifying its colour- or emission-properties when the PCM changes between the solid state and the liquid state; and c2) a dye uncapable of modifying its colour- or emission-properties when the PCM between the solid state and the liquid state; and articles containing it. It also relates to processes for their preparation and their uses in therapy, cosmetics, diagnostics, optics and anti-fake technology.

17 Claims, No Drawings

PHOTOINDUCED THERMOCHROMIC OR THERMOLUMINESCENT COMPOSITION

CROSS-REFERENCE

The present application is a 35 U.S.C. § 371 national-phase filing of International Application No. PCT/EP2020/084371 (filed Dec. 3, 2020), which claims the benefit of and priority to European Patent Application 19383086.6 (filed Dec. 5, 2019), both of which applications are incorporated herein by reference in their entirety.

The present invention relates to photoactive functional materials. In particular, the present invention relates to photoinduced thermochromic or thermoluminescent compositions containing nanoparticles, phase change materials (PCM) and dyes; and articles containing them. The present invention also relates to processes for their preparation and uses in therapy, cosmetics, diagnostics and optics.

BACKGROUND ART

Photoactive functional materials and particularly light-responsive chromic and emissive materials are smart systems capable to respond to optical stimuli. These materials have been proposed for applications in a large variety of areas such as optics, electronics, medicine and imaging among other fields. The key component of these smart materials is the photochromic unit, which typically consists of organic photoisomerizable compounds capable to interconvert between different states with distinct absorption and/or emission spectra (e.g. azobenzenes, spiropyran, etc.). As a result, their colour and/or fluorescence vary under illumination if the absorption/emission properties of one of the two states (isomers) are different. Alternatively, photochromes can be coupled to non-photoisomerizable fluorophores to achieve luminescence modulation via engineered interchromophoric interactions (e.g. photoinduced energy or electron transfer) in one of the two isomeric form of the photochrome. In either case a molecular photoswitch is needed to achieve the photoswitchable material.

More recently, a wealth of research is being addressed to shift the light response of the fluorescence modulation unit from the highly energetic UV to the harmless visible and near infrared (NIR) spectral regions. NIR-responsive photoswitchable dyes would not only allow improving their fundamental material functionalities (e.g. fatigue resistance or inhibition of eventual destructive readouts) but are of relevance in biomedical applications (i.e. less tissues photodamage, deeper light penetration in biological environments) or solar-energy related applications (exploiting the NIR portion of the solar radiation). Currently, NIR-responsive switchable materials are accomplished by: i) direct (though not straightforward) molecular design and synthesis of photo-switches absorbing at lower frequencies; ii) multiphoton absorption of the dye or the switch sensitizer, or iii) using NIR-absorbing (photoinduced electron transfer, triplet, singlet) sensitizers or upconverting nanoparticles.

However, while photochrome-based smart materials possess the inherent advantages of using light as an external stimulus, which is a remote and non-invasive stimulation with precise time and spatial control, these materials suffer from several drawbacks, especially those developed to be active in the NIR region. The drawbacks of the above-mentioned strategies are listed below:

They still suffer complex and time-consuming syntheses and/or require high excitation power densities to activate the switching unit.

They involve direct or sensitized isomerizable molecules (cis-trans or ring opening/closure reactions), limiting the choice of the colour/fluorescence modulator to specific types of molecules (e.g. spiropyran, chromenes, azobenzenes, diarylethene, among others). This is even more evident if long wavelength-responsive systems (e.g. NIR) are needed, where the availability of commercial photochromes is rather limited.

Their light-induced operation is far from optimal, as they frequently present limited photoisomerization probabilities and/or efficiencies (low quantum yields).

Non-negligible photodegradation effects are provoked under continuous illumination (direct excitation), especially if harmful UV radiation is used.

When used in the solid state or dispersed in solid matrices, additional detrimental effects in the light-induced behaviour of photochromes are often observed with respect to solution (e.g. matrix effect that inhibits the photochromic performances).

Since light is required for both changing and monitoring the state of the system, undesirable photochrome interconversion can occur when measuring the colour and/or emission of the material, which may become a severe restriction for some applications (i.e. destructive readout).

Therefore, from what is known in the state of the art, there is still the need of providing improved processes for the preparation of NIR photo-switchable chromic and emissive materials.

SUMMARY OF INVENTION

The inventors of the present invention have surprisingly provided highly efficient photoswitchable materials through a photoinduced thermochromic or thermoluminescent composition. In particular, the inventors have found that the compositions of the present invention show higher absorptivity, photostability and spectral tunability than those disclosed in the state of the art. These compositions comprise nanoparticles capable of absorbing NIR radiation and converting the NIR radiation into heat, in particular metal gold nanoparticles; one or more PCMs; and one or more dyes.

In particular, the inventors have found that the use of nanoparticles capable of absorbing NIR radiation and converting the near-infrared radiation into heat, in particular metal gold nanoparticles, in combination with PCMs allow promoting the phase change (from solid to liquid) of the PCM after exciting the photoinduced thermochromic or thermoluminescent compositions of the present invention with low-energy (i.e. NIR) and low power-density radiation. This phase change of the PCM (i.e. melting/solidification) of the present invention alters the absorption/emission properties of the dye producing its colour or emission change.

Furthermore, the photoinduced thermochromic or thermoluminescent composition of the present invention is also advantageous because of the use of low-energy radiation (i.e. NIR) and the activation of the nanoparticles at the wavelength of the NIR range, in particular metal gold nanoparticles, which avoids the undesirable photochemical processes, disclosed in the state of the art, associated to the use of high-energy radiation (i.e. harmful UV) that induces the direct photoexcitation of the photochromic dye. Thus, the use of low-energy radiation guarantees the increase of the useful lifetime of these materials due to the prevention of the degradation of the components of the composition.

The behaviour of the dyes (both chromic and/or emitting compounds) included in the photoinduced thermochromic or thermoluminescent compositions of the present invention can be tuned by changing the dye, the PCM, the type and/or the concentration of the nanoparticles, the excitation power density and/or the presence of additional chromic or fluorochromic promoters. For the purpose of the present invention, the behaviour of the dyes refers to the type of colour/emission, the kinetic response and/or the colour/emission intensity.

The composition of the invention also has a low content of NIR-absorbing nanoparticles, particularly metal nanoparticles and has a homogeneous distribution of the NIR-absorbing nanoparticles. It is advantageous because it does not affect the final colour of the material and allows maintaining the homogeneity and intensity of the colour- or emission change in all the compositions.

To sum up, the advantages of the photoinduced thermochromic or thermoluminescent composition of the present invention can be associated to the combination of the components of the compositions and the use of the nanoparticles, in particular metal gold nanoparticles, as trigger agent for the change of colour/emission.

These advantages are listed herein below:

The preparation of tunable nanoparticles capable of absorbing NIR radiation and converting the NIR radiation into heat, in particular metal gold nanoparticles, as triggering unit and a photoinduced thermochromic or thermoluminescent composition containing them is easier than the preparation of NIR absorbing molecular dyes and compositions containing them.

The nanoparticles capable of absorbing NIR radiation and converting the NIR radiation into heat, in particular metal gold nanoparticles, present in the composition of the invention, benefit of higher absorptivity, photostability, photothermal efficiency and easier spectral tunability than organic dyes; allowing the use of low-power NIR radiation to trigger the change of the state of the PCM from solid to liquid (melting).

The compositions of the present invention prescind of direct or sensitized photoisomerization for the absorption/emission modulation, circumventing typical issues related to photochromes such as low photoisomerization quantum yields, photodegradation, destructive readout or complex designs of energy/electron transfer schemes, and give access to a broader variety of dyes to build colour or emission photo-switches.

The decoupling of the triggering unit (by absorbing in the NIR) from the colour/emission changing dyes, allows using UV filters in the final application guaranteeing a much higher protection of the dyes and lower fatigue resistance (longer lasting materials).

Contrarily to what happens to standard T-type photochromic materials falling outside of the scope of the present invention and disclosed in the state of the art, with the compositions of the present invention the photo-activated state is as more favoured as the higher the temperature. This is not achievable by using standard T-type photochromic materials, whose equilibrium is shifted to the non-photoactivated state as the temperature increases.

Thus, the photoinduced thermochromic or thermoluminescent compositions of the present invention have multiple advantages in comparison with the state of the art, as it is demonstrated in the experimental data disclosed in the examples. Mainly, they have a tunable, rapid, clear optical response and strong change of colour and/or emission.

Thus, the first aspect of the invention relates to a composition photoinduced thermochromic or thermoluminescent composition, comprising: a) nanoparticles capable of absorbing near-infrared radiation (NIR) and converting the NIR radiation into heat; b) one or more phase change materials (PCM) selected from the group consisting of: b1) a PCM capable of acting as chromic or fluorochromic promoter; and b2) a PCM uncapable of acting as chromic or fluorochromic promoter; c) one or more dyes selected from the group consisting of: c1) a dye capable of modifying its colour- or emission-properties when the PCM changes between the solid state and the liquid state; and c2) a dye uncapable of modifying its colour- or emission-properties when the PCM between the solid state and the liquid state; wherein:—when the PCM is uncapable of acting as chromic or fluorochromic promoter (b2), and the dye is uncapable of modifying its colour- or emission-properties when the PCM changes between the solid state and the liquid state (c2); then the photoinduced thermochromic or thermoluminescent composition further comprises one or more chromic or fluorochromic promoter selected from the group consisting of colour developers, emission quenchers, and emission activators; or alternatively, when at least the PCM is capable of acting as chromic or fluorochromic promoter (b1) or the dye is capable of modifying its colour- or emission-properties when the PCM changes between the solid state and the liquid state (c1); then the photoinduced thermochromic or thermoluminescent composition optionally comprises (d) one or more chromic or fluorochromic promoter selected from the group consisting of colour developers, emission quenchers, and emission activators; wherein the nanoparticles (a) are metal gold nanoparticles capable of absorbing near-infrared radiation (NIR) and converting the NIR radiation into heat.

The second aspect of the invention relates to a photoinduced thermochromic or thermoluminescent free-standing film comprising the photoinduced thermochromic or thermoluminescent composition as defined in the first aspect of the invention, one or more polymers; and optionally one or more excipients.

The third aspect of the invention relates to a photoinduced thermochromic or thermoluminescent article comprising the compositions as defined in the first aspect of the invention; or alternatively the free-standing film as defined in the second aspect of the invention.

The fourth aspect of the invention relates to the use in optics of: a photoinduced thermochromic or thermoluminescent composition, comprising: a) nanoparticles capable of absorbing near-infrared radiation (NIR) and converting the NIR radiation into heat, in particular metal gold nanoparticles; b) one or more phase change materials (PCM) selected from the group consisting of: b1) a PCM capable of acting as chromic or fluorochromic promoter; and b2) a PCM uncapable of acting as chromic or fluorochromic promoter; c) one or more dyes selected from the group consisting of: c1) a dye capable of modifying its colour- or emission-properties when the PCM changes between the solid state and the liquid state; and c2) a dye uncapable of modifying its colour- or emission-properties when the PCM between the solid state and the liquid state; wherein:—when the PCM is uncapable of acting as chromic or fluorochromic promoter (b2), and the dye is uncapable of modifying its colour- or emission-properties when the PCM changes between the solid state and the liquid state (c2); then the photoinduced thermochromic or thermoluminescent composition further comprises one or more chromic or fluorochromic promoter selected from the group consisting of colour developers, emission quenchers, and emission activators; or alternatively, when at least the PCM is capable of acting as chromic or fluorochromic promoter (b1) or the dye is capable of modifying its colour- or emission-properties when the PCM changes between the solid state and the liquid state (c1); then the photoinduced thermochromic or thermoluminescent composition optionally comprises (d) one or more chromic or fluorochromic promoter selected from the group consisting of colour developers, emission quenchers, and emission activators; or alternatively, a photoinduced thermochromic or thermoluminescent free-standing film comprising the photoinduced thermochromic or thermoluminescent composition, one or more polymers; and optionally one or more excipients; or alternatively, a photoinduced thermochromic or thermoluminescent article comprising photoinduced thermochromic or thermoluminescent composition; or the free-standing film.

The fifth aspect of the invention relates to the use for anti-fake technology of: a photoinduced thermochromic or thermoluminescent composition, comprising: a) nanoparticles capable of absorbing near-infrared radiation (NIR) and converting the NIR radiation into heat, in particular metal gold nanoparticles; b) one or more phase change materials (PCM) selected from the group consisting of: b1) a PCM capable of acting as chromic or fluorochromic promoter; and b2) a PCM uncapable of acting as chromic or fluorochromic promoter; c) one or more dyes selected from the group consisting of: c1) a dye capable of modifying its colour- or emission-properties when the PCM changes between the solid state and the liquid state; and c2) a dye uncapable of modifying its colour- or emission-properties when the PCM between the solid state and the liquid state; wherein:—when the PCM is uncapable of acting as chromic or fluorochromic promoter (b2), and the dye is uncapable of modifying its colour- or emission-properties when the PCM changes between the solid state and the liquid state (c2); then the photoinduced thermochromic or thermoluminescent composition further comprises one or more chromic or fluorochromic promoter selected from the group consisting of colour developers, emission quenchers, and emission activators; or alternatively, when at least the PCM is capable of acting as chromic or fluorochromic promoter (b1) or the dye is capable of modifying its colour- or emission-properties when the PCM changes between the solid state and the liquid state (c1); then the photoinduced thermochromic or thermoluminescent composition optionally comprises (d) one or more chromic or fluorochromic promoter selected from the group consisting of colour developers, emission quenchers, and emission activators; or alternatively, a photoinduced thermochromic or thermoluminescent free-standing film comprising the photoinduced thermochromic or thermoluminescent composition, one or more polymers; and optionally one or more excipients; or alternatively, a photoinduced thermochromic or thermoluminescent article comprising photoinduced thermochromic or thermoluminescent composition; or the free-standing film.

DETAILED DESCRIPTION OF THE INVENTION

All terms as used herein in this application, unless otherwise stated, shall be understood in their ordinary meaning as known in the art. Other more specific terms as used in the present application are as set forth below and are intended to apply uniformly throughout the specification and claims unless an otherwise expressly set out definition provides a broader definition.

For the purposes of the present invention, all given ranges include both the lower and the upper endpoints of the range. Ranges given, such as temperatures, times, weights, and the like, should be considered approximate, unless specifically stated.

As it is mentioned above, the present invention relates to a photoinduced thermochromic or thermoluminescent composition. The term "photoinduced" refers to the fact that the effect is induced by the action of light. For the purpose of the present invention, the colour or emission change is induced by the irradiation of light, particularly the irradiation of NIR radiation. The term "thermochromic" refers to compositions that change or are capable of changing their colour (hues) in response to temperature fluctuations. Therefore, for the purpose of the invention, a "photoinduced thermochromic" composition refers to a composition that changes or is capable of changing its absorption spectrum (colour) by a fluctuation of the temperature promoted by the irradiation, particularly by the irradiation of NIR. Furthermore, the term "thermoluminescent" refers to compositions that change or are capable of changing their emission capability in response to temperature fluctuations. Therefore, for the purpose of the invention, a "photoinduced thermoluminescent" composition refers to a composition that changes or is capable of changing its emission by a fluctuation of the temperature promoted by irradiation, particularly by the irradiation of NIR.

In an embodiment, the photoinduced thermochromic or thermoluminescent composition is selected from the group consisting of:

a) nanoparticles capable of absorbing NIR radiation and converting the NIR radiation into heat, in particular metal gold nanoparticles;
b) one or more PCMs capable of acting as chromic or fluorochromic promoter (b1) in their solid and/or liquid state;
c) one or more dyes uncapable of modifying their colour- or emission-properties when the PCM changes between the solid state and the liquid state (c2); and
optionally, d) one or more chromic or fluorochromic promoter selected from the group consisting of colour developers, emission quenchers, and emission activators;

a) nanoparticles capable of absorbing NIR radiation and converting the NIR radiation into heat, in particular metal gold nanoparticles;
b) one or more PCMs uncapable of acting as chromic or fluorochromic promoter (b2) in their solid and/or liquid state;
c) one or more dyes capable of modifying their colour- or emission-properties when the PCM changes between the solid state and the liquid state (c1); and
optionally, d) one or more chromic or fluorochromic promoter selected from the group consisting of colour developers, emission quenchers, and emission activators;

a) nanoparticles capable of absorbing NIR radiation and converting the NIR radiation into heat, in particular metal gold nanoparticles;
b) one or more PCMs capable of acting as chromic or fluorochromic promoter (b1) in their solid and/or liquid state;
c) one or more dyes capable of modifying their colour- or emission-properties when the PCM changes between the solid state and the liquid state (c1); and
optionally, d) one or more chromic or fluorochromic promoter selected from the group consisting of colour developers, emission quenchers, and emission activators;

and
a) nanoparticles capable of absorbing NIR radiation and converting the NIR radiation into heat, in particular metal gold nanoparticles;
b) one or more PCMs uncapable of acting as chromic or fluorochromic promoter (b2) in their solid and/or liquid state;
c) one or more dyes uncapable of modifying their colour- or emission-properties when the PCM changes between the solid state and the liquid state (c2); and
d) one or more chromic or fluorochromic promoter selected from the group consisting of colour developers, emission quenchers, and emission activators.

In an embodiment, the photoinduced thermochromic or thermoluminescent composition of the present invention comprises:
a) nanoparticles capable of absorbing NIR radiation and converting the NIR radiation into heat, in particular metal gold nanoparticles;
b) one or more PCMs capable of acting as chromic or fluorochromic promoter (b1) in their solid and/or liquid state;
c) one or more dyes uncapable of modifying their colour- or emission-properties when the PCM changes from between the solid state and the liquid state (c2); and
optionally, d) one or more chromic or fluorochromic promoter selected from the group consisting of colour developers, emission quenchers, and emission activators;

In an embodiment, the photoinduced thermochromic or thermoluminescent composition of the present invention comprises:
a) nanoparticles capable of absorbing NIR radiation and converting the NIR radiation into heat, in particular metal gold nanoparticles;
b) one or more PCMs uncapable of acting as chromic or fluorochromic promoter (b2) in their solid and/or liquid state;
c) one or more dyes capable of modifying their colour- or emission-properties when the PCM changes between the solid state and the liquid state (c1); and
optionally, d) one or more chromic or fluorochromic promoter selected from the group consisting of colour developers, emission quenchers, and emission activators;

In an embodiment, the photoinduced thermochromic or thermoluminescent composition of the present invention comprises:
a) nanoparticles capable of absorbing NIR radiation and converting the NIR radiation into heat, in particular metal gold nanoparticles;
b) one or more PCMs capable of acting as chromic or fluorochromic promoter (b1) in their solid and/or liquid state;
c) one or more dyes capable of modifying their colour- or emission-properties when the PCM changes between the solid state and the liquid state (c1); and
optionally, d) one or more chromic or fluorochromic promoter selected from the group consisting of colour developers, emission quenchers, and emission activators;

In an embodiment, the photoinduced thermochromic or thermoluminescent composition of the present invention comprises:
a) nanoparticles capable of absorbing NIR radiation and converting the NIR radiation into heat, in particular metal gold nanoparticles;
b) one or more PCMs uncapable of acting as chromic or fluorochromic promoter (b2) in their solid and/or liquid state;
c) one or more dyes uncapable of modifying their colour- or emission-properties when the PCM changes between the solid state and the liquid state (c2); and
d) one or more chromic or fluorochromic promoter selected from the group consisting of colour developers, emission quenchers, and emission activators.

Material Composition

Nanoparticles

The compositions of the present invention comprise nanoparticles capable of absorbing NIR radiation and converting the NIR radiation into heat, in particular metal gold nanoparticles. As it is disclosed above, these nanoparticles are capable of absorbing NIR radiation and converting the near-infrared radiation into thermal energy (heat), which allows the change of state of the PCM from solid state to the liquid state.

For the purposes of the present invention, the nanoparticles capable of absorbing NIR radiation and converting the NIR radiation into heat absorb NIR radiation having a wavelength from 600 nm to 2200 nm. In an embodiment, the nanoparticles capable of absorbing NIR radiation and converting the NIR radiation into heat absorb NIR radiation having a wavelength from 650 nm to 1600 nm. In an embodiment, the nanoparticles capable of absorbing NIR radiation and converting the NIR radiation into heat absorb NIR radiation having a wavelength from 700 nm to 1200 nm. In an embodiment, the nanoparticles capable of absorbing NIR radiation and converting the near-infrared radiation into heat absorb NIR radiation having a wavelength from 700 nm to 900 nm. In a particular embodiment, the nanoparticles capable of absorbing NIR radiation and converting the NIR radiation into heat absorb NIR radiation having a wavelength of 830 nm.

In an embodiment, the nanoparticles capable of absorbing NIR radiation and converting the near-infrared radiation into heat are non-metal nanoparticles capable of absorbing NIR radiation and converting the near-infrared radiation into heat.

In an embodiment, the nanoparticles capable of absorbing NIR radiation and converting the NIR radiation into heat are metal nanoparticles (MPs) capable of absorbing NIR radiation and converting the NIR radiation into heat. For the purpose of the invention, the terms "metal nanoparticles capable of absorbing NIR radiation and converting the NIR radiation into heat", "NIR-absorbing metal nanoparticles" and "NIR-absorbing MPs" have the same meaning and are used interchangeable. The abbreviation "MPs" stands for metal nanoparticles.

The presence of NIR-absorbing MPs in the composition of the invention, in particular metal gold nanoparticles, is advantageous because allows:
  minimizing or eliminating the colour contribution of the MPs to the material in which they are incorporated,
  the selective irradiation in the NIR of the MPs without exciting the dyes prevents their photodegradation,
  the use of low-energy radiation, which does not produce harmful effects on the material or substrate,
  achieving high photothermal effect efficiency by irradiating with NIR radiation, without using a large amount of MPs,
  the use of highly penetrating radiation (not absorbed by other material components), enabling the activation of chromogenic/emission switches more deeply in materials or in deeper biological tissues.

In an embodiment, the composition comprises NIR-absorbing MPs having a particle size from 5 to 500 nm. In an embodiment, the composition comprises NIR-absorbing MPs having a particle size from 5 to 100 nm. The composition comprises NIR-absorbing MPs having a particle size from 50 to 90 nm. The term "particle size" refers to the size of the particles measured in nm. The measurement was performed with an appropriate apparatus by conventional analytical techniques such as, for example, microscopic determination utilizing a scanning electron microscope (SEM) or scanning electron microscope (TEM). In the present invention the particle size was measured by dynamic light-scattering (DLS, z-sizer) technique. This data is then analysed using the general-purpose model to calculate the size of the particles that created the scattering pattern, assuming a spherical particle shape. The terms "particle size distribution" or "PSD" have the same meaning and are used interchangeably. They refer to the distribution of sizes for the particles prepared.

In an embodiment, the composition of the invention comprises NIR-absorbing MPs wherein the metal is selected from the group consisting of gold, platinum, silver, palladium, rhodium, osmium, ruthenium, rhodium, rhenium, molybdenum, copper, iron, nickel, tin, beryllium, cobalt, antimony, chromium, manganese, zirconium, tin, zinc, tungsten, titanium, vanadium, lanthanum, cerium, an alloy thereof, an oxide thereof, and a mixture thereof. In an embodiment, the composition of the invention comprises NIR-absorbing MPs wherein the metal is selected from the group consisting of gold, platinum, palladium, silver, copper, aluminium, an alloy thereof, an oxide thereof, and a mixture thereof. In an embodiment, the composition of the invention comprises NIR-absorbing MPs wherein the metal is selected from the group consisting of gold, platinum, silver, palladium, rhodium, osmium, ruthenium, rhodium, rhenium, molybdenum, iron, nickel, tin, beryllium, cobalt, antimony, chromium, manganese, zirconium, tin, zinc, tungsten, titanium, vanadium, lanthanum, cerium, an alloy thereof, an oxide thereof, and a mixture thereof. In an embodiment, the composition of the invention comprises NIR-absorbing MPs wherein the metal is selected from the group consisting of gold, platinum, palladium, silver, aluminium, an alloy thereof, an oxide thereof, and a mixture thereof. In a particular embodiment, the composition of the invention comprises NIR-absorbing MPs wherein the metal is gold, an oxide thereof, and a mixture thereof. In a particular embodiment, the composition of the invention comprises NIR-absorbing MPs wherein the metal is silver, an oxide thereof, and a mixture thereof.

As used herein, the term "nanoparticle" refers to particles having nanoscale dimensions, i.e., having a diameter of from 5 to 500 nm, and having any size, shape or morphology. As used herein, the term nanoparticle may include spherical nanoparticles as well as non-spherical nanoparticles. In an embodiment, the composition of the invention comprises NIR-absorbing nanoparticles wherein in a form selected from the group consisting of nanospheres, nanostars, nano-dumbells, nanotubes, nanoshells, nanorods, nanocages, nano-half-shells, nanodomes and nanopyramids. In an embodiment, the composition of the invention comprises NIR-absorbing nanoparticles wherein in a form selected from the group consisting of nanospheres, nanoshells and nanorods. In an embodiment, the composition of the invention comprises NIR-absorbing nanoparticles in form of nanoshells.

The term "nanoshell" is a type of nanoparticles characterized by a discrete core-shell structure in which the shell surrounds at least a portion of a core. The core of the nanoshell may be hollow (i.e., empty or filled with a gas) or it may be filled with a liquid (aqueous, oil, etc.) or a solid (i.e. polymer) different from that of the shell. The term "nanospheres" refers to a type of nanoparticles characterized by a solid structure with spherical or quasi-spherical shape.

The term "nanorods" refers to a type of nanoparticles characterized by a solid structure and a anisotropic rod-like shape with longitudinal and transversal axes of different length.

In an embodiment, the composition of the invention is one wherein the NIR-absorbing MPs are gold nanoshells.

In an embodiment, the composition of the invention comprises NIR-absorbing MPs in an amount from 0.00005 mg to 0.5 mg per mg of PCMs; particularly from 0.00024 mg to 0.15 mg per mg of PCM. Therefore, the compositions of the present invention comprise a low content of nanoparticles, which is advantageous because allows reducing the cost of the final material and minimizing or eliminating the optical variations of the material containing the MPs deriving from the colour of the NIR-absorbing MPs.

PCMs

The compositions of the invention comprise one or more phase change materials (herein below PCM). As it is mentioned above, PCMs are substances presenting high latent heats of fusion, storing and releasing large amounts of energy upon melting and solidification, respectively. For the purpose of the invention, the term "PCM" refers to a material that is capable of changing from solid state to liquid state upon the absorption of heat and capable of changing from liquid state to solid state by the release of heat.

The composition of the present invention comprises one or more PCMs (b) selected from the group consisting of b1) a PCM capable of acting as chromic or fluorochromic promoter; and b2) a PCM uncapable of acting as chromic or fluorochromic promoter;

In an embodiment, the composition comprises one or more PCMs capable of acting as chromic or fluorochromic promoter (b1). The term "capable of acting as chromic or fluorochromic promoter" refers to the compounds that can initiate the change of colour and/or emission properties (absorption/emission bands position and intensity), modulate the speed of changing of the colour or emission properties. In an embodiment, the composition comprises one or more PCMs capable of acting as chromic or fluorochromic promoter (b1). In an embodiment, the composition comprises one or more PCMs capable of acting as chromic or fluorochromic promoter (b1) being other than an alkane-containing PCM, an alkene-containing PCM and an alkyne-containing PCM. In an embodiment, the composition comprises one or more PCMs capable of acting as chromic or fluorochromic promoter (b1) selected from the group consisting of an acid-containing compound, an amine-containing compound, a sulphur-containing compound, an alcohol-containing compound and a mixture thereof. In an embodiment, the composition comprises one or more PCMs capable of acting as chromic or fluorochromic promoter (b1) selected from the group consisting of an acid-containing compound; an amine-containing compound; a sulphur-containing compound selected from the group consisting of thiol-containing compound, sulphate-containing compound, sulfonate-containing compound and a mixture thereof; an alcohol-containing compound and a mixture thereof.

In an embodiment, the composition comprises one or more PCMs capable of acting as chromic or fluorochromic promoter (b1) selected from the group consisting of $(C_1-C_{30})$-alkyl-COOH, $(C_1-C_{30})$-alkyl-COO$(C_1-C_{30})$alkyl, $(C_1-C_{30})$-alkyl-OH, $(C_1-C_{30})$-alkyl-O—$(C_1-C_{30})$alkyl, $(C_1-C_{20})$-alkyl-NH$_2$, $(C_1-C_{20})$-alkyl-NH$((C_1-C_{20})$alkyl$)_2$, $(C_1-C_{20})$-alkyl-N$((C_1-C_{20})$alkyl$)_3$, $(C_1-C_{20})$-alkyl-NH—CO—$(C_1-C_{20})$-alkyl, $(C_1-C_{20})$-alkyl-N(CO—$(C_1-C_{20})$- alkyl$)_2$, $(C_2-C_{30})$-alkenyl-COOH, $(C_2-C_{30})$-alkenyl-COO$(C_1-C_{30})$ alkenyl, $(C_2-C_{30})$-alkenyl-OH, $(C_2-C_{30})$-alkenyl-O—$(C_2-C_{30})$alkenyl, $(C_2-C_{20})$-alkenyl-NH$_2$, $(C_2-C_{20})$-alkenyl-NH$((C_2-C_{20})$alkenyl$)_2$, $(C_2-C_{20})$-alkenyl-N$((C_1-C_{20})$alkenyl$)_3$, $(C_2-C_{20})$-alkenyl-NH—CO—$(C_2-C_{20})$-alkenyl, $(C_2-C_{20})$-alkenyl-N(CO—$(C_2-C_2$a)-alkenyl$)_2$, $(C_1-C_{30})$-alkyl-O—$(C_2-C_{30})$alkenyl, $(C_2-C_{30})$-alkenyl-O—$(C_1-C_{30})$alkyl, $(C_1-C_{20})$-alkyl-NH—CO—$(C_2-C_{20})$-alkenyl, $(C_2-C_{20})$-alkenyl-NH—CO—$(C_1-C_{20})$-alkyl, $(C_1-C_{20})$-alkyl-N(CO—$(C_2-C_{20})$-alkenyl$)_2$, $(C_2-C_{20})$-alkenyl-N(CO—$(C_1-C_{20})$-alkyl$)_2$, $C_2-C_{30}$)-alkynyl-COOH, $(C_2-C_{30})$-alkynyl-COO$(C_2-C_{30})$ alkynyl, $(C_2-C_{30})$-alkynyl-OH, $(C_2-C_{30})$-alkynyl-O—$(C_2-C_{30})$-alkynyl, $(C_2-C_{20})$-alkynyl-NH$_2$, $(C_2-C_{20})$-alkynyl-NH$((C_2-C_{20})$alkynyl$)_2$, $(C_2-C_{20})$-alkynyl-N$((C_2-C_{20})$alkynyl$)_3$, $(C_2-C_{20})$-alkynyl-NH—CO—$(C_2-C_{20})$-alkynyl, $(C_2-C_{20})$-alkynyl-N(CO—$(C_2-C_{20})$-alkynyl$)_2$, $(C_1-C_{30})$-alkyl-O—$(C_2-C_{30})$-alkynyl, $(C_2-C_{30})$-alkynyl-O—$(C_1-C_{30})$-alkyl, $(C_5-C_{20})$-alkyl-NH—CO—$(C_2-C_{20})$-alkynyl, $(C_2-C_{20})$-alkynyl-NH—CO—$(C_1-C_{20})$-alkyl, $(C_1-C_{20})$-alkyl-N(CO—$(C_2-C_{20})$-alkynyl$)_2$, $(C_2-C_{20})$-alkynyl-N(CO—$(C_1-C_{20})$-alkyl$)_2$, triglycerides and isomers thereof.

In an embodiment, the composition comprises one or more PCMs capable of acting as chromic or fluorochromic promoter (b1) selected from the group consisting of $(C_4-C_{30})$-alkyl-COOH, $(C_1-C_{30})$-alkyl-COO$(C_1-C_{30})$alkyl, $(C_8-C_{30})$-alkyl-OH, $(C_1-C_{30})$-alkyl-O—$(C_1-C_{30})$alkyl, $(C_5-C_{20})$-alkyl-NH$_2$, $(C_1-C_{20})$-alkyl-NH$((C_1-C_{20})$alkyl$)_2$, $(C_1-C_{20})$-alkyl-N$((C_1-C_{20})$alkyl$)_3$, $(C_5-C_{20})$-alkyl-NH—CO—$(C_1-C_{20})$-alkyl, $(C_1-C_{20})$-alkyl-N(CO—$(C_1-C_{20})$- alkyl$)_2$, $(C_2-C_{30})$-alkenyl-COOH, $(C_2-C_{30})$-alkenyl-COO$(C_2-C_{30})$ alkenyl, $(C_8-C_{30})$-alkenyl-OH, $(C_2-C_{30})$-alkenyl-O—$(C_2-C_{30})$alkenyl, $(C_5-C_{20})$-alkenyl-NH$_2$, $(C_2-C_{20})$-alkenyl-NH$((C_2-C_{20})$alkenyl$)_2$, $(C_2-C_{20})$-alkenyl-N$((C_2-C_{20})$alkenyl$)_3$, $(C_5-C_{20})$-alkenyl-NH—CO—$(C_2-C_{20})$-alkenyl, $(C_2-C_{20})$-alkenyl-N(CO—$(C_2-C_{20})$-alkenyl$)_2$, $(C_1-C_{30})$-alkyl-O—$(C_2-C_{30})$alkenyl, $(C_2-C_{30})$-alkenyl-O—$(C_1-C_{30})$alkyl, $(C_5-C_{20})$-alkyl-NH—CO—$(C_2-C_{20})$-alkenyl, $(C_5-C_{20})$-alkenyl-NH—CO—$(C_1-C_{20})$-alkyl, $(C_1-C_{20})$-alkyl-N(CO—$(C_2-C_{20})$-alkenyl$)_2$, $(C_2-C_{20})$-alkenyl-N(CO—$(C_1-C_{20})$-alkyl$)_2$, $C_4-C_{30}$)-alkynyl-COOH, $(C_2-C_{30})$-alkynyl-COO$(C_2-C_{30})$ alkynyl, $(C_8-C_{30})$-alkynyl-OH, $(C_2-C_{20})$-alkynyl-O—$(C_2-C_{30})$alkynyl, $(C_5-C_{20})$-alkynyl-NH$_2$, $(C_2-C_{20})$-alkynyl-NH$((C_2-C_{20})$alkynyl$)_2$, $(C_2-C_{20})$-alkynyl-N$((C_2-C_{20})$alkynyl$)_3$, $(C_5-C_{20})$-alkynyl-NH—CO—$(C_2-C_{20})$-alkynyl, $(C_2-C_{20})$-alkynyl-N(CO—$(C_2-C_{20})$-alkynyl$)_2$, $(C_1-C_{30})$-alkyl-O—$(C_2-C_{30})$-alkynyl, $(C_2-C_{30})$-alkynyl-O—$(C_1-C_{30})$-alkyl, $(C_5-C_{20})$-alkyl-NH—CO—$(C_2-C_{20})$-alkynyl, $(C_5-C_{20})$-alkynyl-NH—CO—$(C_1-C_{20})$-alkyl, $(C_1-C_{20})$-alkyl-N(CO—$(C_2-C_{20})$-alkynyl$)_2$, $(C_2-C_{20})$-alkynyl-N(CO—$(C_1-C_{20})$-alkyl$)_2$, triglycerides and isomers thereof.

In an embodiment, the composition of the invention is one wherein one or more PCMs capable of acting as chromic or fluorochromic promoter (b1) are selected from the group $(C_4-C_{30})$-alkyl-COOH and isomers thereof. In an embodiment, the composition of the invention is one wherein one or more PCMs capable of acting as chromic or fluorochromic promoter (b1) are selected from the group consisting of dodecanoic acid, stearic acid and a mixture thereof. In an embodiment, the composition of the invention is one wherein the one or more PCMs capable of acting as chromic or fluorochromic promoter (b1) are selected from the group $(C_1-C_{30})$-alkyl-COO$(C_1-C_{30})$alkyl, consisting of methyl palmitate, methyl stearate, and methyl arachidate and isomers thereof. In an embodiment, the composition of the invention is one wherein the one or more PCMs capable of acting as chromic or fluorochromic promoter (b1) are $(C_8-C_{30})$-alkyl-OH. The term "alkyl-OH" refers to a saturated, branched or linear hydrocarbon which contains the number of carbon atoms specified in the description or claims, wherein at least one of the hydrogen atoms is substituted by a hydroxyl group. In an embodiment, the composition of the invention is one wherein the one or more PCMs capable of acting as chromic or fluorochromic promoter (b1) are selected from the group $(C_8-C_{30})$-alkyl-OH and isomers thereof such as for example 1-tetradecanol, 1-hexadecanol, 1-heptadecanol, 1-octadecanol or a mixture thereof. In an embodiment, the composition of the invention is one wherein the one or more PCMs capable of acting as chromic or fluorochromic promoter (b1) are selected from the group $(C_8-C_{30})$-alkyl-OH, such as for example 1-tetradecanol, 1-hexadecanol or a mixture thereof. In an embodiment, the composition of the invention is one wherein the one or more PCMs capable of acting as chromic or fluorochromic promoter (b1) are selected from the group consisting of $(C_1-C_{20})$-alkyl-NH$_2$, $(C_1-C_{20})$-alkyl-NH—$(C_1-C_{20})$alkyl, $(C_1-C_{20})$-alkyl-N$((C_1-C_{20})$alkyl$)_2$, $(C_5-C_{20})$-alkyl-NH—CO—$(C_1-C_{20})$-alkyl, $(C_1-C_{20})$-alkyl-N(CO—$(C_1-C_{20})$-alkyl$)_2$, and isomers thereof. In an embodiment, the composition of the invention is one wherein the one or more PCMs capable of acting as chromic or fluorochromic promoter (b1) are $(C_1-C_{20})$-alkyl-NH$_2$, such as 1-hexadecylamine, 1-octadecylamine and a mixture thereof. In an embodiment, the composition of the invention is one wherein the PCMs capable of acting as chromic or fluorochromic promoter (b1) is 1-octadecylamine. In an embodiment, the composition of the invention comprises one or more PCMs capable of acting as chromic or fluorochromic promoter (b1) being triglycerides. In an embodiment, the composition of the invention is one wherein the one or more PCMs capable of acting as chromic or fluorochromic promoter (b1) are triglycerides selected from the group consisting of glyceryl trinonanoate, glyceryl trilaurate, glyceryl trimyristate, glyceryl tripalmitate and glyceryl tristearate. The term "triglyceride" refers to an ester derived from glycerol and one, two or three fatty acids, particularly selected from CH$_2$(OCO$(C_1-C_{30})$alkyl)-CH(OCO$(C_1-C_{30})$alkyl)-CH$_2$(OCO$(C_1-C_{30})$ alkyl). Each "alkyl" term independently refers to a saturated linear, or branched hydrocarbon chain which contains the number of carbon atoms specified in the description or claims.

The composition of the present invention comprises one or more PCMs uncapable of acting as chromic or fluorochromic promoter (b2). The term "uncapable of acting as chromic or fluorochromic promoter" refers to the compounds that cannot initiate the change of colour or emission, improve the speed of changing and/or increase the chromic or fluorochromic dynamic range. In an embodiment, the composition comprises one or more PCMs uncapable of acting as chromic or fluorochromic promoter (b2) selected from the group consisting of alkane-based PCM, alkene-based PCM, alkyne-based and a mixture thereof. In an embodiment, the composition comprises one or more PCMs uncapable of acting as chromic or fluorochromic promoter (b2) selected from the group consisting of $(C_8-C_{52})$alkane-based PCM, $(C_{14}-C_{50})$alkene-based PCM, $(C_{14}-C_{50})$alkyne-based PCM and a mixture thereof. In an embodiment, the composition comprises one or more PCMs uncapable of acting as chromic or fluorochromic promoter (b2) selected from the group consisting of $(C_{10}-C_{52})$alkane-based PCM, $(C_{16}-C_{50})$alkene-based PCM, $(C_{16}-C_{50})$alkyne-based and a mixture thereof. In an embodiment, the composition comprises one or more PCMs uncapable of acting as chromic or fluorochromic promoter (b2) selected from the group consisting of $(C_{10}-C_{52})$alkane-based PCM, $(C_{16}-C_{50})$alkene-based PCM (e.g. 1-hexadecene, eicosene), $(C_{16}-C_{50})$alkyne-based PCM (e.g. 1-hexadecyne), $(C_{16}-C_{50})$alkene-based PCM and $(C_{16}-C_{50})$alkyne-based PCM containing 2 or more alkyne (dienes) or alkyne functionality, and a mixture thereof. In an embodiment, the composition comprises one or more PCMs uncapable of acting as chromic or fluorochromic promoter (b2) is a $(C_{10}-C_{52})$alkane based PCMs. The term "alkane" refers to a saturated, branched or linear hydrocarbon which contains the number of carbon atoms specified in the description or claims. The term "alkene" refers to branched or linear hydrocarbon which contains the number of carbon atoms specified in the description or claims and having at least one double carbon bond. The term "alkyne" refers to branched or linear hydrocarbon which contains the number of carbon atoms specified in the description or claims and having at least one triple carbon bond. In an embodiment, the composition of the invention is one which comprises one or more PCM uncapable of acting as chromic or fluorochromic promoters selected from the group consisting tetradecane, pentadecane, eicosane (EC), tetracosane, hexacosane, octacosane (OC), nonacosane, triacontane, dotriacontane, tritriacontane, tetracontane, tetratetracontane, pentacontane and tetrapentacontane; particularly the composition of the invention comprises one or more PCM uncapable of acting as chromic or fluorochromic promoters selected from the group consisting of selected from the group consisting of eicosane (EC) and octacosane (OC).

Dyes

The photoinduced thermochromic composition of the present invention comprises one or more dyes (c) selected from the group consisting of c1) a dye capable of modifying its colour- or emission-properties when the PCM changes between the solid state and the liquid state; and c2) a dye uncapable of modifying its colour- or emission-properties when the PCM between the solid state and the liquid state.

For the purpose of the present invention, the term "dye" refers to any substance that has colour- or emission-properties, which means a substance that is a coloured substance, luminescent (i.e. fluorescent substance or phosphorescent substance) and also substance capable of becoming coloured and/or luminescent (i.e. fluorescent emission and/or phosphorescence emission).

Capable Dyes

In an embodiment, the composition of the invention comprises a dye capable of modifying its colour- or emission-properties when the PCM changes between the solid state and the liquid state (b1). The term "a dye capable of modifying its colour- or emission-properties when the PCM changes between the solid state and the liquid state" refers to a dye that when the PCM changes from the solid state to the liquid state, from the liquid state to the solid state or both intrinsically is capable of showing colouration, discolouration, change of colour, luminescence quenching (e.g. fluorescence quenching or phosphorescence quenching), luminescence activation (e.g. fluorescence activation or phosphorescence activation), or change of luminescence (i.e. fluorescence or phosphorescence). It means that these dyes have for their own without the need of the presence of chromic or fluorochromic promoters the capability of showing colouration, discolouration, change of colouration, luminescence quenching (e.g. fluorescence quenching or phosphorescence quenching), luminescence activation (e.g. fluorescence activation or phosphorescence activation) or change of luminescence (i.e. fluorescence or phosphorescence).

—Colour Changing Dyes

The photoinduced thermochromic composition comprises one or more dyes selected from the group of dyes changing their colour depending on the aggregation/proximity state and/or temperature. The dyes, whose colour depends on aggregation/proximity state are selected from those forming J-aggregates and H-aggregates that show different colours from the non-aggregated state. Examples of these dyes are, but not limited to, polycyclic aromatic hydrocarbons and cyanine dyes.

—Luminescence Changing Dyes

The photoinduced thermoluminescent composition comprises one or more luminescent agents. Commonly, the term "luminescent agent" refers to any compound capable of emitting energy in the form of UV, visible or NIR radiation previously absorbed during exposure to excitation by radiation. The emission could be, but not limited to, fluorescence or phosphorescence.

In an embodiment, the photoinduced thermoluminescent composition comprises one or more dyes selected from the group of dyes changing their luminescence depending on aggregation/proximity state and dyes with viscosity/rigidity dependent emission.

The dyes, whose colour depends on the aggregation/proximity state are selected from the group of those forming J-aggregates and H-aggregates, aggregation-induced-emission (AIE) dyes, aggregation caused quenching (ACQ) dyes and dyes forming excimers. Examples of these dyes are, but not limited to, polycyclic aromatic hydrocarbon such as perylene, pyrene, anthracene, rubrene, rhodamine B base (RhB), tetraphenylethene (TPE) and derivatives thereof, such as 9,10-dimethylanthracene, 9,10-diphenylanthracene, 9,10-dicyanoantracene (DCA) and 1,3,6,8-tetraphenylpyrene.

In an embodiment, the photoinduced thermoluminescent composition is one wherein one or more luminescent agents whose emission is dependent on the viscosity/rigidity of the medium. In an embodiment, the photoinduced thermoluminescent composition is one wherein one or more luminescent are {[5'-(p-hydroxyphenyl)-2,2'-bithienyl-5-yl]-methylidene}-propanedinitrile (NIAD-4) and TPE.

Uncapable Dyes

In an embodiment, the composition of the invention comprises a dye uncapable of modifying its colour- or emission-properties when the PCM changes between the solid state and the liquid state (b2). The term "a dye uncapable of modifying its colour- or emission-properties when the PCM changes between the solid state and the liquid state" refers to a dye that when the PCM changes from the solid state to the liquid state, from the liquid state to the solid state or both is non-capable, intrinsically, of showing colouration, discolouration, change of colouration, luminescence quenching (e.g. fluorescence quenching or phosphorescence quenching), luminescence activation (e.g. fluorescence activation or phosphorescence activation) or change of luminescence (i.e. fluorescence or phosphorescence). It means that these dyes intrinsically do not have the capability of showing colouration, discolouration, change of colouration, luminescence quenching, luminescence activation or change of luminescence for their own, but in the presence of a chromic or fluorochromic promoter they can show colouration, discolouration, change of colouration, luminescence quenching, luminescence activation or change of luminescence.

—Colour Changing Dyes

In an embodiment, the photoinduced thermoluminescent composition comprises one or more dyes selected from the group consisting of charge-transfer dyes (redox dyes), pH-response dyes, polarity dependent dyes.

In an embodiment, the photoinduced thermochromic composition comprises one or more pH responsive dyes. Examples of pH response dyes are, but not limited to, spirolactons, spiropyrans, spirooxazines, fluorans and chromenes dyes. These dyes change their colour upon establishing hydrogen-bonding interactions or acid-base reactions with colour developers or with a PCM capable of acting as colour developer in the solid or liquid state.

In an embodiment, the photoinduced thermochromic composition comprises one or more redox dyes. Examples of redox dyes include, but not limited to, methylene blue, methyl viologen, azur B, thionine acetate salt, safranin O, and neutral red. These dyes change their colour upon formation of charge-transfer complexes with colour developers (electron-donors/acceptors) or with a PCM capable of acting as colour developer in the solid or liquid state.

—Luminescence Changing Dyes

In an embodiment, the photoinduced thermoluminescent composition comprises one or more luminescent agents selected from the group consisting of a charge-transfer dyes (redox dyes), pH-responsive dyes, polarity dependent dyes, pH sensitive luminescent dye, and a redox luminescent agent.

In an embodiment, the photoinduced thermoluminescent composition is one wherein the one or more luminescent agents are pH sensitive luminescent agents. In an embodiment, the photoinduced thermoluminescent composition is one wherein the one or more luminescent agents is a pH sensitive luminescent agent selected from the group consisting of fluorescein, rhodamine 6G, RhB, and derivatives (e.g. derivatives of coumarins and fluorans).

In an embodiment, the photoinduced thermoluminescent composition is one wherein one or more luminescent agents are redox luminescent dyes. In an embodiment, the photoinduced thermoluminescent composition is one wherein the one or more luminescent agents are redox luminescent agents selected from the group consisting of derivatives of polycyclic aromatic hydrocarbons. In an embodiment, the photoinduced thermoluminescent composition is one wherein the one or more luminescent agents is selected from the group consisting of RhB, perylene diimide (PDI), N,N'-bis(sec-butyl)-1,6,7,12-tetra-(4-tert-butylphenoxy)perylene-3,4:9,10-tetracarboxylic diimide (PTDI), and DCA, which change their emission when interacting with electron donors or acceptors.

The appropriate dye and colour or fluorochromic promoter, their amounts and the specific experimental conditions appropriate for the photoinduced changes of the optical properties can readily be determined by those skilled in the art according to the type of dye and the composition, free-standing film or article being prepared. For instance, a composition of the invention comprises RhB as dye and an acidic promoter or alternatively an acidic PCM, wherein the photoinduced luminescence is performed in the liquid state of the PCM.

In an embodiment, the photoinduced thermochromic or thermoluminescent composition comprising one or more dyes as defined above in an amount from 0.005 to 5% by weight of the composition. In an embodiment, the photoinduced composition is a thermochromic composition comprises one or more dyes as defined above in an amount from 0.1 to 5% by weight of the composition; particularly from 1.4 to 3% by weight of the composition. In an embodiment, the photoinduced composition is a thermoluminescent composition comprising one or more dyes as defined above in an amount from 0.01 to 2.5% by weight of the composition. The term "percentage (%) by weight" refers to the percentage of each ingredient of the composition in relation to the total weight. The compositions of the present invention contain a low content of dye, homogenously distributed in the material and providing a uniform colour.

Colour Developer

The photoinduced thermochromic compositions of the present invention can comprise one or more colour developer. Particularly, when the PCM is uncapable of acting as chromic promoter (b2), and the dye is uncapable of modifying its colour- or emission-properties when the PCM changes between the solid state and the liquid state (c2); then the photoinduced thermochromic or thermochromic composition further comprises one or more chromic promoter being colour developers. Even when the PCM is capable of acting as chromic promoter (b1) or the dye is capable of modifying its colour-properties when the PCM changes between the solid state and the liquid state (c1); then the photoinduced thermochromic composition optionally comprises (d) one or more chromic promoter being colour developers. The term "colour developer" refers to a compound capable of causing a change in the colour-properties of the dye, such as the colouration/discolouration of the dye.

The colour developer, even if the colour developer is a PCM (b1) or not, interacts with the dye in its solid or liquid state. The type of interaction that induces the colour change could be within hydrogen-bonding, acid-base reaction (proton transfer), and/or electron transfer.

In an embodiment, the composition comprises a colour developer selected from the group consisting of an acid, a base, a hydrogen-bonding compound, an electron transfer compound, or a mixture thereof. Examples of acid colour developers appropriate for the present invention includes, without limitation, acids, alcohols, and a mixture thereof.

Examples of base colour developers appropriate for the present invention includes, without limitation, amines, and a mixture thereof. Examples of hydrogen-bonding compound appropriate for the present invention includes, without limitation, acids, alcohols, amines and a mixture thereof. Examples of electron transfer compound appropriate for the present invention includes, without limitation, thiols, amines and a mixture thereof.

In an embodiment, the colour developer is a lipophilic "colour developer" as defined above. The terms "lipophilic", "hydrophobic" and "non-polar" have the same meaning and are used interchangeable. They refer to a compound which is soluble in neutral non-polar solvent, rather than in water. Lipophilic molecules in water often can form aggregates than can only be redispersed in water but not dissolved.

As it is well known for the skilled person in the art, a parameter useful to determine whether a compound is hydrophilic or lipophilic is determining its partition coefficient (P). The partition (P) coefficient is the ratio of concentrations of a particular compound in a mixture of two immiscible phases at equilibrium. Normally one of the solvents chosen is water while the second is hydrophobic such as octanol. Hydrophobic active ingredients have high octanol/water partition coefficients, and hydrophilic compounds have low octanol/water partition coefficients. The log P value is also known as a measure of lipophilicity/ hydrophilicity. The logarithm of the ratio of the concentrations of the un-ionized solute in the solvents, at a specific pH, is called log P: The log P value is also known as a measure of lipophilicity:

$$\log P_{oct/wat} = \log\left(\frac{[\text{solute}]_{octanol}}{[\text{solute}]_{water}^{un-ionized}}\right)$$

wherein the "solute" is the active ingredient.

For the purpose of the invention, a compound is considered "lipophilic" wherein the log P value is equal to or higher than 2.4.

In an embodiment, the colour developer is selected from the PCMs dodecanoic acid, stearic acid, 1-tetradecanol, 1-hexadecanol, dodecyclphosphonic acid, octyl p-hydroxybenzoate, bisphenol A.

For halochromic dyes, the proton exchange between the colour developers (capable of donating/receiving a proton) and the dye (capable of accepting/donating the proton), causes the colour change of the dye. In an embodiment, the photoinduced thermochromic compositions of the present invention comprises a colour developer selected from the PCMs dodecanoic acid, stearic acid, 1-tetradecanol, 1-hexadecanol, dodecyclphosphonic acid, octyl p-hydroxybenzoate, bisphenol A. For dyes that change their colour upon establishing hydrogen-bonding interactions, the formation of these interactions between the dye and the colour developer induces the development of colour. For dyes that change their colour when forming a charge-transfer complex through electron transfer, the interaction of the dye with electron donors/acceptors produces the colour development.

In an embodiment, the photoinduced thermochromic composition comprises one or more colour developers as defined in the present invention in an amount from 0.1 to 15% by weight of the composition; particularly from 1 to 10% by weight of the composition.

Emission Activator

The photoinduced thermoluminescent compositions of the present invention can comprise one or more emission activators. Particularly, when the PCM is uncapable of acting as fluorochromic promoter (b2), and the dye is uncapable of modifying its—emission-properties when the PCM changes between the solid state and the liquid state (c2); then the photoinduced thermoluminescent composition further comprises one or more fluorochromic promoter being emission activators. When even the PCM is capable of acting as fluorochromic promoter (b1) or the dye is capable of modifying its—emission-properties when the PCM changes between the solid state and the liquid state (c1); then the photoinduced thermoluminescent composition can optionally comprises (d) one or more fluorochromic promoter being emission activators. The term "emission activator" refers to a compound capable of causing the emission enhancement of a dye.

In an embodiment, the chromic or fluorochromic promoter is an emission activator selected from the group consisting of singlet, triplet sensitizer, fluorescence resonance energy transfer (FRET) sensitizer and electron-transfer sensitizer, and a mixture thereof.

In an embodiment, the emission activator is selected from the group consisting of benzophenone, perylene, pyrene, cyanine and boradiazaindacene (BODIPY) derivatives, platinum octaethylporphyrin, palladium tetraanthraporphyrin.

In an embodiment, the photoinduced thermoluminescent composition comprise one or more emission activator as defined in the present invention in an amount from 0.001 to 10% by weight of the composition. In an embodiment, the photoinduced thermoluminescent composition comprises one or more emission activator as defined in the present invention in an amount from 0.001 to 10% by weight of the composition from 0.01 to 9% by weight of the composition.

Emission Quencher

The photoinduced thermoluminescent compositions of the present invention can comprise one or more emission quencher. Particularly, when the PCM is uncapable of acting as fluorochromic promoter (b2), and the dye is uncapable of modifying its—emission-properties when the PCM changes between the solid state and the liquid state (c2); then the photoinduced thermoluminescent composition further comprises one or more fluorochromic promoter being emission quenchers. When even the PCM is capable of acting as fluorochromic promoter (b1) or the dye is capable of modifying its—emission-properties when the PCM changes between the solid state and the liquid state (c1); then the photoinduced thermoluminescent composition can optionally comprise (d) one or more fluorochromic promoter being emission quenchers. The term "emission quencher" refers to a compound capable of causing the inhibition of the emission of the dye. The type of interaction that induces the inhibition of the emission is mediated by energy and/or electron transfer.

In an embodiment, the emission quencher is selected from the group consisting of RET quencher, triplet quencher, electron-transfer quencher, and a mixture thereof.

In an embodiment, the emission quencher is selected from the group consisting perylene, pyrene, anthracene, amine and a mixture thereof.

In an embodiment, the emission quencher as defined in the present invention is in an amount from 0.001 to 0.5% by weight of the composition. In an embodiment, the emission quencher as defined in the present invention is in an amount from 0.005 to 0.1% by weight of the composition.

Capsules

In an embodiment, the photoinduced thermochromic or thermoluminescent compositions of the present invention comprise capsules. In an embodiment, the photoinduced thermochromic or thermoluminescent compositions of the present invention comprise capsules selected from nanocapsules and microcapsules. The term "microcapsules" refers to capsules having microscale dimensions, i.e. having a diameter from higher than 0.20 µm, and having any shape or morphology. In an embodiment, the photoinduced thermochromic or thermoluminescent compositions of the present invention comprises microcapsules as defined herein having a particle size from 0.21 to 400 µm measured by SEM. In an embodiment, the photoinduced thermochromic or thermoluminescent compositions of the present invention comprises capsules as defined above having a particle size from 0.5 µm to 5 µm measured by SEM or master sizer.

The term "nanocapsules" refers to capsules having nanoscale dimensions, i.e., having a diameter from 20 to lower than 200 nm, and having any shape or morphology. In an embodiment, the photoinduced thermochromic or thermoluminescent compositions of the present invention comprises nanocapsules as defined above having a particle size from 30 nm to 150 nm measured by SEM, transmission electron microscopy (TEM) and DLS. The nanocapsules are advantageous because they allow obtaining transparent materials, such as for example film formed materials once combined with polymeric agents, which are suitable for optical applications requiring transparency. The nanocapsules are also advantageous because they allow being used in biomedicine applications. The reduced size allows entering through the cell membrane.

In an embodiment, the photoinduced thermochromic or thermoluminescent compositions of the present invention comprise capsules selected from the group core-shell micro- or nano-capsules and solid lipid micro- or nano-particles.

In an embodiment, the photoinduced thermochromic or thermoluminescent compositions of the present invention comprise core-shell micro- or nano-capsules. The term "core-shell capsules" refers to capsules formed by a core and a shell surrounding at least a portion of the core.

In one embodiment, the photoinduced thermochromic or thermoluminescent compositions of the present invention comprise core-shell micro- or nano-capsules wherein the core comprises one or more core forming materials. In one embodiment, the photoinduced thermochromic or thermoluminescent compositions of the present invention comprise core-shell micro- or nano-capsules wherein the core comprises one or more PCM as defined herein as core forming materials. Examples of appropriate core forming materials for the present invention include, but without limitation, eicosane, stearic acid and a mixture thereof.

The photoinduced thermochromic or thermoluminescent compositions of the present invention comprise core-shell micro- or nano-capsules wherein the shell comprises one or more polymeric shell materials selected from the group consisting of organic polymeric shell materials and inorganic polymeric shell materials. Examples of appropriate organic polymeric shell materials for the present invention include, but without limitation, linear or crosslinked poly (methyl methacrylate), polystyrene, polyamide, polyurea, polyurethane, polycarbonate, polysulphone, polyether sulfone, polyetherimide and a mixture thereof. Examples of appropriate inorganic polymeric shell materials for the present invention include, but without limitation, $SiO_2$, $TiO_2$, $VO_2$, and a mixture thereof. This structuration is especially advantageous because the shell confines the core material, particularly the PCMs, avoiding their diffusion and allowing a reproducible change of colour or emission.

In an embodiment, the photoinduced thermochromic or thermoluminescent compositions of the present invention comprise solid lipid micro- or nano-particles. The terms "solid lipid particles" or "SLPs" refer to a capsule that possess a solid lipid core matrix. The term "lipid" is used here in a broader sense and includes triglycerides (e.g., tristearin), alkanes (e.g. eicosane), diglycerides (e.g., glycerol behenate), monoglycerides (e.g., glycerol monostearate), fatty acids (e.g., stearic acid), steroids (e.g., cholesterol), and waxes (e.g., cetyl palmitate). It means that the SLPs do not have a shell material surrounding the solid lipid core matrix. This structuration is especially advantageous because it allows an easier processing but requires an additional treatment (such as coating or embedment) with a polymeric material to avoid diffusion and leaking of the matrix forming agent, particularly the PCM, in the liquid state.

In one embodiment, the photoinduced thermochromic or thermoluminescent compositions of the present invention comprise SLPs, wherein the SLPs comprise one or more PCMs. Examples of appropriate PCM for the present invention include, but without limitation, eicosane, stearic acid and a mixture thereof.

In one embodiment, the photoinduced thermochromic or thermoluminescent compositions of the present invention comprise SLPs, wherein the SLPs further comprise one or more appropriate thermoplastic polymers, which include, but without limitation, polystyrene (PS), polyethersulphone, polycarbonate, polymethylmethacrylate, polyetherimide and a mixture thereof. These compositions comprise thermoplastic polymers allows having an irreversible change of colour or emission.

In one embodiment, the photoinduced thermochromic or thermoluminescent compositions of the present invention comprise SLPs wherein the SLPs comprise a mixture of one or more PCM as defined herein and one or more thermoplastic polymers as defined above, wherein the content of the thermoplastic polymer is equal to or higher than 50% by weight of the SLPs.

In an embodiment, the photoinduced thermochromic or thermoluminescent compositions of the present invention comprise capsules, wherein said capsules comprise inside the nanoparticles, the PCMs, the one or more dyes and, if required, the one or more chromic or fluorochromic promoters. The compositions of the invention which comprises these capsules are advantageous because allows having a close contact between the nanoparticles and the PCM. Thus, the capsules could be used as ink or paint to prepare coatings or films. The capsules could be embedded in films or coating of a polymeric material of different nature.

In an embodiment, the photoinduced thermochromic or thermoluminescent compositions of the present invention comprises capsules, wherein said capsules comprises inside the PCM, one or more dyes and, when required, the one or more chromic or fluorochromic promoters. It means that the nanoparticles are not inside the capsules but they are homogeneously distributed in the excipients or vehicles forming part of the coating, the free-standing film or the embedded article as defined below; or alternatively the nanoparticles are in the shell material as the shell forming material, within or attached to the shell. For example, the nanoparticles can be homogeneously distributed in the free-standing film material in which the capsules are embedded. The compositions of the invention which comprises these capsules are advantageous because allow obtaining films or coating of different materials, containing the capsules. Moreover, the capsules homogeneously distributed in the polymer coating or film allow that the heat generated by the nanoparticles, particularly MPs, reaches quickly all the capsules, inducing a fast colour or emission change.

In an embodiment, the photoinduced thermochromic or thermoluminescent compositions of the present invention, which comprise the capsules as defined above are in form of a suspension composition comprising an external phase and the capsules as defined in the present invention suspended in this phase. In an embodiment, the external phase comprises one or more solvents selected from the group consisting of water, organic solvents and a mixture thereof. In an embodiment, the external phase comprises one or more solvents selected from the group consisting of water, methanol, ethanol, acetone, hexane, dimethylformamide and a mixture thereof; particularly water. In an embodiment, the photoinduced thermochromic or thermoluminescent compositions of the present invention are in the form of a suspension composition as defined above, wherein the capsules comprise inside the nanoparticles, the PCMs, the one or more dyes and, if required, the one or more chromic or fluorochromic promoters. In an embodiment, the photoinduced thermochromic or thermoluminescent compositions of the present invention are in form of a water suspension composition, wherein the capsules comprise inside the PCM, one or more dyes and, when required, the one or more chromic or fluorochromic promoters. It means that the nanoparticles are not inside the capsules, but they are homogeneously distributed in the external phase or are forming part of the shell or are deposited on the shell material of the capsules. It is also a part of the invention a process for the preparation of the above-mentioned suspensions, particularly water suspensions.

In an embodiment, the photoinduced thermochromic or thermoluminescent compositions of the present invention, which comprise the capsules as defined above are in form of a dry powder compositions. In an embodiment, the photoinduced thermochromic or thermoluminescent compositions of the present invention are in the form of a dry powder composition, wherein capsules comprise inside the nanoparticles, the PCMs, the one or more dyes and, if required, the one or more chromic or fluorochromic promoters. In an embodiment, the photoinduced thermochromic or thermoluminescent compositions of the present invention are in the form of a dry powder compositions, wherein the capsules comprise inside the PCM, one or more dyes and, when required, the one or more chromic or fluorochromic promoters. It means that the nanoparticles are not inside the capsules, but they are present in the powder, externally to the capsules, or are forming part of the shell or are deposited on the shell material of the capsules. It is also a part of a process for the preparation of the above-mentioned dry powder compositions which comprises submitting the suspension as defined above under a spray-drying, freeze-drying or solvent evaporation conditions to eliminate the solvent of the suspension.

In an embodiment, the compositions of the present invention further comprise additional components selected from the group consisting of pharmaceutical active ingredients and reactive oxygen species. When present, these components are commonly mixed with the one or more PCM forming part of the compositions of the present invention.

All embodiments as defined above for the photoinduced thermochromic or thermoluminescent compositions as defined in the present invention in relation to the components also apply to the capsules, water suspensions and dry powder compositions as defined in the present invention.

Photoinduced Thermochromic or Thermoluminescent Free-Standing Films

As it is disclosed above, the second aspect of the invention relates to a photoinduced thermochromic or thermoluminescent free-standing film comprising the photoinduced thermochromic or thermoluminescent composition as defined in the invention, one or more polymers; and optionally one or more excipients.

As used herein the term "free-standing film" refers to a film which has a physically stable shape and is dimensionally stable on its casting surface and can be removed from the casting surface without having to be supported over most of its surface area.

The photoinduced thermochromic or thermoluminescent free-standing rigid or flexible films of the invention optionally comprise one or more excipients, which allows creating the desired shaped to the photoinduced thermochromic or thermoluminescent composition. The appropriate excipients and their amounts can readily be determined by those skilled in the art according to the type of formed material being prepared. Appropriate excipients can be stabilizers to prevent MPs and capsules aggregation. The preparation of these photoinduced thermochromic or thermoluminescent free-standing film can be carried out by methods known in the technique. Commonly, the preparation of free-standing films implies the use of extrusion, elongation, injection-moulding, casting, in-situ polymerization, spray coating, spin-coating, Dr-Blade coating and roll-to-roll coating. The film is removed from the substrate, for example by peeling off the film or dissolving the substrate.

All embodiments as defined above for the photoinduced thermochromic or thermoluminescent compositions as defined in the present invention in relation to the components also apply to the photoinduced thermochromic or thermoluminescent free-standing films of the second aspect of the invention. Photoinduced thermochromic or thermoluminescent free-standing films are considered materials/compositions that can be used for the final applications.

Photoinduced Thermochromic or Thermoluminescent Articles

As it is disclosed above, the third aspect of the invention relates to a photoinduced thermochromic or thermoluminescent article which comprises photoinduced thermochromic or thermoluminescent compositions as defined in the first aspect of the invention; or alternatively the photoinduced thermochromic or thermoluminescent free-standing films as defined in the second aspect of the invention.

Photoinduced thermochromic or thermoluminescent articles are considered materials/compositions that can be used for the final applications.

In an embodiment, the photoinduced thermochromic or thermoluminescent article is a coated article (A) comprising: a substrate; and a photoinduced thermochromic or thermoluminescent coating deposited on the surface of the substrate, wherein: the coating comprises the composition as defined in the present invention, and optionally, one or more coating forming agents. The term "coated article" refers to an article comprising a substrate covered by one or more layers formed by a coating composition. In an embodiment, the coated article is selected from a mono-layered, bi-layered and multi-layered coated article. For the purpose of the invention the coating of the substrate with thermochromic or thermoluminescent composition can be performed by any method known in the art for coating any surface. Examples of appropriate substrates for the present invention include, without limitation, non-porous and porous substrates. The photoinduced thermochromic or thermoluminescent coating composition optionally comprises one or more coating forming agents. The appropriate excipients and their amounts can readily be determined by those skilled in the art according to the type of substrate being coated. In an embodiment, the photoinduced thermochromic or thermoluminescent article comprises a substrate selected from the group consisting of glass, polymeric sheets, textile material, cellulosic material, and wood, transparent or opaque substrates, and curved or flat substrates.

In an embodiment, the photoinduced thermochromic or thermoluminescent article is an embedded article (B) comprising: a porous substrate; a photoinduced thermochromic or thermoluminescent composition as defined in the first aspect of the invention embedded in the porous substrate; and optionally, one or more additional external coatings. The term "embedded article" refers to an article formed by a porous substrate that contains inside the pores the photoinduced thermochromic or thermoluminescent composition.

Particularly, the photoinduced thermochromic or thermoluminescent composition is deposited on the surface of the substrate and penetrates through the pores. For the purpose of the present invention, the term "porous substrate" refers to a substrate having a plurality of pores or through pores that permit the photoinduced thermochromic or thermoluminescent to pass across the substrate, wherein the composition will take the form of the pores. These articles are advantageous because the pores of the substrate prevent the diffusion of the photoinduced thermochromic or thermoluminescent composition; particularly those compositions which are in form of SLPs or as non-structured material. For the purpose of the invention the process for the preparation of the embedded articles of the present invention can be performed by any method known in the art. Examples of appropriate methods for the present invention include, without limitation, casting, in-situ polymerization (in case that a polymeric matrix if desired), spray coating, spin-coating, Dr-Blade coating, and substrate impregnation. The photoinduced thermochromic or thermoluminescent article can optionally comprise one or more excipients or carriers. The appropriate excipients or carriers and their amounts can readily be determined by those skilled in the art according to the type of substrate being embedded. The photoinduced thermochromic or thermoluminescent article is an embedded article that optionally comprises one or more additional external coatings. These additional external coatings can be waterproof coatings, corrosion resistance coatings, scratch-resistant coatings among others. The composition and the process for the preparation of these additional external coatings can readily be determined by those skilled in the art according to the type of external coating being prepared. These embedded articles of the present invention are advantageous because allow having a homogeneous change of the colour or emission in the whole substrate using a low concentration of nanoparticles homogeneously dispersed.

The photoinduced thermochromic or thermoluminescent compositions of the present invention are advantageous because of their versatility and usefulness for the coating of a huge variety of substrates; particularly porous substrates. In an embodiment, the photoinduced thermochromic or thermoluminescent porous substrate is selected from the group consisting of textile-based substrate, polyamide-based substrate, polyester-based substrate, cellulose-based substrate, and a mixture thereof. In an embodiment, the photoinduced thermochromic or thermoluminescent porous substrate is selected from the group consisting of paper, paper money, wood and cotton.

In an embodiment, the photoinduced thermochromic or thermoluminescent article is a free-standing film containing article, which comprises one or more photoinduced thermochromic or thermoluminescent free-standing film as defined in the present invention. The definition of the term "free-standing" as defined above for the film also applies to the "article" containing it.

The photoinduced thermochromic or thermoluminescent coating of the photoinduced thermochromic or thermoluminescent coated article, the photoinduced thermochromic or thermoluminescent embedded article and the free-standing film containing article can be covering a surface of the substrate or alternatively can be sandwiched between two or more surfaces (or layers) such as for example between glasses or polymeric sheets.

In an embodiment, the photoinduced thermochromic or thermoluminescent article comprises a transparent photoinduced thermochromic or thermoluminescent composition or free-standing film comprising nanocapsules having a particle size from 20-150 nm measured by SEM, TEM and DLS methods. The transparent photoinduced thermochromic or thermoluminescent compositions or free-standing films of the present invention are advantageous because they can be useful in the optics field when the final article is also transparent (which means that the substrate is also transparent). Alternatively, the transparent photoinduced thermochromic or thermoluminescent compositions or free-standing films of the present invention, on top of non-transparent substrates, is useful to allow seeing through the film the appearance of the coated articles, without altering their aspect.

In an embodiment, the photoinduced thermochromic or thermoluminescent article comprises a photoinduced thermochromic or thermoluminescent composition comprising capsules, wherein the nanoparticles, the one or more PCMs, the one or more dyes, and if required, the one or more chromic or fluorochromic promoter are inside the capsule.

In an embodiment, the photoinduced thermochromic or thermoluminescent article comprises a photoinduced thermochromic or thermoluminescent composition comprising capsules, wherein the one or more PCMs, the one or more dyes, and if required the one or more chromic or fluorochromic promoters are inside the capsule; and the nanoparticles are dispersed in the excipients and/or carriers forming part of the coating, embedding material or the free-standing film, or alternatively forming part of the shell.

In an embodiment, the photoinduced thermochromic or thermoluminescent substrate of the present invention comprises a photoinduced thermochromic or thermoluminescent coating deposited on a surface or embedded in a surface or forming a free-standing film having a thickness from 0.01 µm to 1000 µm. This is advantageous because it provides the functionality of NIR-induced thermochromic or thermoluminescent properties to the final article.

The change of the colour or emission of the articles of the present invention as defined above induced by the increase of the temperature promoted by the irradiation of the nanoparticles by a low-energy radiation (NIR) is rapid, uniform, strong. This change could be reversible or irreversible.

In an embodiment, the distribution of the nanoparticles in the photoinduced thermochromic or thermoluminescent articles as defined above is from 0.000008 to 0.00014 mg of nanoparticles per $mm^2$ of substrate.

All embodiments as defined above for the photoinduced thermochromic or thermoluminescent compositions and formed materials as defined in the present invention in relation to the components also apply to the photoinduced thermochromic or thermoluminescent articles of the third aspect of the invention.

Preparation of the Photoinduced Thermochromic or Thermoluminescent Compositions

It is also part of the invention processes for the preparation of the photoinduced thermochromic or thermoluminescent compositions of the first aspect of the invention.

In an embodiment, wherein the photoinduced thermochromic or thermoluminescent compositions do not comprise capsules, then the process comprises: preparing a solution of the PCMs; with one or more dyes; and, if required, the one or more chromic or fluorochromic promoters; and mixing the solution thus obtained with the nanoparticles as defined in the invention.

In an embodiment, wherein the photoinduced thermochromic or thermoluminescent compositions are structured as capsules as defined in the present invention, then the process comprises preparing the capsules by any method known in the state of the art.

In an embodiment, the capsules are SLPs capsules comprising inside the nanoparticles, the one or more PCMs; the one or more dyes; and, if required, the one or more chromic or fluorochromic promoters. The process comprises performing an emulsification/cooling process, a spontaneous emulsification/solvent displacement process, an emulsion-solvent evaporation, or alternatively a hot-extrusion process; particularly an emulsification/cooling process. As an example, a more detailed description of a general procedure for the preparation of compositions comprising SLP capsules is provided. Initially, the dyes and, if required, the one or more chromic or fluorochromic promoter are dissolved in the PCM in its molten state (optionally the nanoparticles and further excipients such as surfactants can be included). Successively, the organic phase thus obtained is mixed with the water phase, formed by water and one or more excipients such as surfactants. The emulsification process is carried out through any method known in the art, for instance high-energy or low-energy methods. In the high energy method, the homogenization is carried out by stirring, high-shear homogenization, ultrasonication, membrane filtration or high-pressure homogenization. The low-energy method include the spontaneous emulsification and phase inversion methods. After the emulsion is obtained (the droplets size is dependent on the emulsification method), it is transferred into a water solution maintained at 5° C. to induce the cooling and the freezing of the PCM.

In an embodiment, the capsules are core-shell capsules comprising inside the nanoparticles, the one or more PCMs; the one or more dyes; and, if required, the one or more chromic or fluorochromic promoters The process for their preparation comprises performing an interfacial polymerization process, a radical polymerization process, a coacervation process, an in-situ polymerization process and a solvent-evaporation/phase separation process; particularly, a phase separation/shell formation process. As an example, a more detailed description of a general procedure for the preparation of compositions comprising core-shell capsules is provided. Initially, the shell forming material (shell polymer); one or more dyes; and if required, the one or more chromic or fluorochromic promoters and the PCM are dissolved in a volatile non-water miscible organic solvent (optionally the nanoparticles and one or more excipients such as surfactant can be included). Successively, the organic phase thus obtained is mixed with the water phase, formed by water and one or more excipients, for instance surfactants. The emulsification process is carried out though high-energy or low-energy methods. In the high-energy method, the homogenization is carried out by stirring, high-shear homogenization, ultrasonication, membrane filtration or high-pressure homogenization. The low-energy methods include the spontaneous emulsification and phase inversion methods. After the emulsion is obtained (the droplets size is dependent on the emulsification method), the organic solvent is evaporated, inducing the precipitation of the shell forming material (shell polymers) around the PCM droplets, which solidify while the evaporation of the solvent occurs.

In an embodiment, the capsules are SLPs or core-shell capsules comprising inside the one or more PCMs; the one or more dyes; and, if required, the one or more chromic or fluorochromic promoter. In this case, the process comprises the preparation of the capsules as disclosed above but including the PCMs, one or more dyes and, if required, the one or more chromic or fluorochromic promoter; following the process disclosed above; and secondly mixing the capsules obtained in previous step with the nanoparticles of the present invention.

In an embodiment, wherein the photoinduced thermochromic or thermoluminescent compositions are in the form of suspensions, then the process involves the preparation of the capsules as disclosed above in water, where they remain after the synthesis or where they can be redispersed from the powder.

In an embodiment, wherein the photoinduced thermochromic or thermoluminescent compositions are in the form of dry powder compositions, then the process comprises performing the processes disclosed above in an appropriate medium such as for example water and further drying the water suspension previously obtained though freeze-drying or spray-drying.

In an embodiment, the processes for the preparation of the compositions of the present invention as defined above further comprise a previous step of preparing the nanoparticles capable of absorbing NIR radiation and converting the NIR into heat. In an embodiment, the processes for the preparation of the compositions of the present invention as defined above further comprise a previous step of preparing the nanoparticles through template methods. The template could be given by self-templating surfactants, oil droplets or solid particles.

In the case of metallic particles, the process comprises reducing a metal salt inside or around the template reducing the metal salt photochemically (irradiation), thermally, electrochemically, through sonication or through chemical agents (e.g. amines). In one embodiment, the template is made by droplets of (3-aminopropyl)triethoxysilane (APTES). In an embodiment, the template is the core-shell capsules or SLPs containing the thermochromic/thermoluminescent composition. In an embodiment, the processes for the preparation of the compositions of the present invention as defined above further comprise a previous step of preparing the nanoparticles, comprising of one-pot synthesis of metal (such as gold) nanoshells via (APTES)-in-water suspension. Particularly, gold nanoshells (AuNSs) are prepared through reduction of chloroauric acid in the presence of APTES nanodroplets in water. APTES nanodroplets act as template for the gold nanoshells. When the $HAuCl_4$ is added migrates to the interface between the droplets and the water. When the reducing agent is added ($NaBH_4$), the gold is reduced and the nanoshell structure is formed. In order to stabilize the AuNSs is necessary to add rapidly a stabilizer such as Bovine Serum Albumin. The appropriate method, reaction conditions and reagents, and their amounts, can readily be determined by those skilled in the art according to the particle size, shape and type of metal of the MPs.

In the case of non-metal particles able to convert NIR into heat such as semiconducting polymer nanoparticles and cyanine dyes nanoparticles, the process comprises an emulsion-solvent displacement method, and emulsion-solvent evaporation.

The appropriate method, reaction conditions and reagents, and their amounts, can be readily determined by those skilled in the art according to the form of the composition and the structure of the PCM.

Preparation of the Photoinduced Thermochromic or Thermoluminescent Free-Standing Films It is also part of the invention processes for the preparation of the photoinduced thermochromic or thermoluminescent free-standing films of the second aspect of the invention, which comprises photoinduced thermochromic or thermoluminescent compositions.

The appropriate method, reaction conditions and reagents, and their amounts, can readily be determined by those skilled in the art according to the formed article and the composition and the structure of the PCM.

In an embodiment, wherein the photoinduced thermochromic or thermoluminescent compositions are structured in capsules containing inside the nanoparticles, one or more PCMs, one or more dyes, and if required, one or more chromic or fluorochromic promoters; and the articles further comprises one or more excipients such as polymeric material, then the process comprises:

1) mixing the capsules suspension with the polymeric material (even the polymer or the monomeric species);
2) depositing the mixture obtained in the previous step onto a substrate; particularly by spin-coating, spray-coating, casting, ink-jet printing, Dr. Blade coating, roll-to-roll and painting;
3) drying or curing the substrate obtained in the previous step to obtain a coated substrate;
4) removing (by peeling off from the substrate or dissolving the substrate) from the substrate to obtain a film suitable for being applied elsewhere.

In an embodiment, wherein the photoinduced thermochromic or thermoluminescent compositions are structured in capsules containing inside the one or more PCMs, one or more dyes, and if required, one or more chromic or fluorochromic promoter; and the articles further comprises one or more excipients such as polymeric material, then the process comprises:
1) mixing the capsules suspension with the polymeric material and the nanoparticles;
2) depositing the mixture obtained in the previous step onto a substrate;
3) drying or curing the substrate obtained in the previous step to obtain a coated substrate
4) removing (by peeling off from the substrate or dissolving the substrate) from the substrate to obtain a film suitable for being apply elsewhere.

In an embodiment, wherein the photoinduced thermochromic or thermoluminescent compositions are structured in capsules containing inside the one or more PCMs, one or more dyes, and if required, one or more chromic or fluorochromic promoter; and the articles further comprises one or more excipients such as polymeric material, then the process comprises:
1) mixing the capsules suspension with the monomeric species of the polymeric material and the nanoparticles;
2) depositing the mixture obtained in the previous step onto a substrate;
3) curing the substrate obtained in the previous step to obtain a coated substrate
4) removing (by peeling off from the substrate or dissolving the substrate) from the substrate to obtain a film suitable for being apply elsewhere.

The film formation of the present invention can be performed by any method disclosed in the art. Commonly, the film formation can be performed by solvent evaporation from preformed dissolved coating materials, coalescening polymer nanoparticle dispersions and from the polymerization of monomers.

Preparation of the Photoinduced Thermochromic or Thermoluminescent Articles

It is also part of the invention processes for the preparation of the photoinduced thermochromic or thermoluminescent articles of the third aspect of the invention, which comprise photoinduced thermochromic or thermoluminescent composition.

In an embodiment, wherein the photoinduced thermochromic or thermoluminescent compositions are not structured in capsules, the process comprises:
1) depositing a water solution of the nanoparticles onto the substrate;
2) drying the substrate thus obtained;
3) depositing a liquid mixture of the PCM, containing one or more dyes, and, if required, the one or more chromic or fluorochromic promoters, at a temperature above the melting point of the PCM onto the substrate obtained in the previous step,
4) cooling the substrate obtained in the previous step, and
5) optionally, covering the substrate obtained in the previous step with one or more additional coating layers by the addition of a polymeric material.

In an embodiment, wherein the photoinduced thermochromic or thermoluminescent compositions are not structured in capsules, the process comprises:
1) depositing a liquid mixture of the PCM, containing the nanoparticles, one or more dyes, and, if required, the one or more chromic or fluorochromic promoter, at a temperature above the melting point of the PCM onto the substrate, layered onto a heated plate,
2) cooling the substrate obtained in the previous step, and
3) optionally, covering the substrate obtained in the previous step with one or more additional coating layers by the addition of a polymeric material.

In an embodiment, wherein the photoinduced thermochromic or thermoluminescent compositions are not structured in capsules, the process comprises:
1) depositing a suspension comprising the nanoparticles onto the substrate;
2) drying the substrate thus obtained in the previous step, and
3) depositing a dry powder composition comprising the PCM, one or more dyes, and, if required, the one or more chromic or fluorochromic promoter,
4) optionally, covering the substrate obtained in the previous step with one or more additional coating layers by the addition of a polymeric material.

In an embodiment, wherein the photoinduced thermochromic or thermoluminescent compositions are not structured in capsules, the process comprises:
1) depositing a dry powder composition comprising the PCM, the nanoparticles, one or more dyes, and, if required, the one or more chromic or fluorochromic promoter,
2) optionally, covering the substrate obtained in previous step with one or more additional coating layers by the addition of a polymeric material.

In an embodiment, wherein the photoinduced thermochromic or thermoluminescent compositions are structured in capsules comprising inside the PCMs, the nanoparticles, one or more dyes, and, if required, the one or more chromic or fluorochromic promoter, the process comprises:
1) depositing a suspension containing the capsules onto the substrate;
2) drying the substrate thus obtained in the previous step, and
3) optionally, covering the substrate obtained in the previous step with one or more additional coating layers by the addition of a polymeric material.

In an embodiment, wherein the photoinduced thermochromic or thermoluminescent compositions are structured in capsules comprising inside the PCMs, the nanoparticles, one or more dyes, and, if required, the one or more chromic or fluorochromic promoter, the process comprises:
1) depositing a dry powder composition containing the capsules onto the substrate;
2) optionally, covering the substrate obtained in the previous step with one or more additional coating layers by the addition of a polymeric material.

In an embodiment, wherein the photoinduced thermochromic or thermoluminescent compositions are structured in capsules comprising inside the PCMs, one or more dyes, and, if required, the one or more chromic or fluorochromic promoters, but not the nanoparticles, the process comprises:

1) depositing a suspension of the nanoparticles onto the substrate,
2) drying the substrate thus obtained;
3) depositing a suspension containing the capsules onto the substrate obtained in the previous step,
4) drying the substrate thus obtained; and
5) optionally, covering the substrate obtained in the previous step with one or more additional coating layers by the addition of a polymeric material;

or alternatively
1) depositing a suspension containing the capsules onto the substrate,
2) drying the substrate thus obtained
3) depositing a solution of the nanoparticles onto the substrate obtained in the previous step; 4) drying the substrate thus obtained, and
5) optionally, covering the substrate obtained in the previous step with one or more additional coating layers by the addition of a polymeric material;

or alternatively
1) depositing a suspension containing the capsules and nanoparticles onto the substrate,
2) drying the substrate thus obtained; and
3) optionally, covering the substrate obtained in the previous step with one or more additional coating layers by the addition of a polymeric material;

or alternatively
1) depositing a dry powder composition containing the nanoparticles forming part of the shell or in the external part of the capsule onto the substrate; and
2) optionally, covering the substrate obtained in the previous step with one or more additional coating layers by the addition of a polymeric material;

or alternatively
1) depositing a suspension containing the nanoparticles forming part of the shell or in the external part of the capsule onto the substrate onto the substrate,
2) drying the substrate thus obtained; and
3) optionally, covering the substrate obtained in the previous step with one or more additional coating layers by the addition of a polymeric material.

In an embodiment, the photoinduced thermochromic or thermoluminescent composition is deposited onto the substrate by using printing techniques. Commonly, the nanoparticles suspension and the PCM mixtures (further containing the one or more dyes, and if required one or more chromic or fluorochromic promoter), are printed in the same or two separated sequential steps.

In an embodiment, wherein the photoinduced thermochromic or thermoluminescent compositions are structured in capsules containing inside the nanoparticles, one or more PCMs, one or more dyes, and if required, one or more chromic or fluorochromic promoters; and the articles further comprises one or more excipients such as polymeric material, then the process comprises:
1) mixing the capsules suspension with the polymeric material (even the polymer or the monomeric species);
2) depositing the mixture obtained in the previous step onto a substrate; particularly by spin-coating, spray-coating, casting, ink-jet printing, Dr. Blade coating, roll-to-roll and painting;
3) drying or curing the substrate obtained in the previous step to obtain a coated substrate.

In an embodiment, wherein the photoinduced thermochromic or thermoluminescent compositions are structured in capsules containing inside the one or more PCMs, one or more dyes, and if required, one or more chromic or fluorochromic promoter; and the articles further comprises one or more excipients such as polymeric material, then the process comprises:
1) mixing the capsules suspension with the polymeric material and the nanoparticles;
2) depositing the mixture obtained in the previous step onto a substrate;
3) drying or curing the substrate obtained in the previous step to obtain a coated substrate.

In an embodiment, wherein the photoinduced thermochromic or thermoluminescent compositions are structured in capsules containing inside the one or more PCMs, one or more dyes, and if required, one or more chromic or fluorochromic promoter; and the articles further comprises one or more excipients such as polymeric material, then the process comprises:
1) mixing the capsules suspension with the monomeric species of the polymeric material and the nanoparticles;
2) depositing the mixture obtained in the previous step onto a substrate;
3) curing the substrate obtained in the previous step to obtain a coated substrate.

The coating formation of the present invention can be performed by any method disclosed in the art. Commonly, the coating formation can be performed by solvent evaporation from preformed dissolved coating materials, coalescening polymer nanoparticle dispersions and from the polymerization of monomers.

In an embodiment, when the compositions of the invention comprise one or more additional components as defined above, then the process comprises performing any of the processes disclosed above and further mixing the additional component with the PCM.

All the embodiments disclosed above for the photoinduced thermochromic or thermoluminescent compositions of the first aspect of the invention, the free-standing films and the articles of the present invention also apply to the processes of their preparation.

Applications of the Photoinduced Thermochromic or Thermoluminescent Compositions It is also part of the invention the use of the compositions, free-standing films and articles of the invention.

The fourth aspect of the invention relates to their use in therapy, cosmetics, diagnostic, and optics.

The photoinduced thermochromic or thermoluminescent compositions structured in capsules, particularly nanocapsules in form of SLPs and core-shell capsules are useful as imaging agent. The term "imaging agent" refers to any substance that is used as a label or enhances specific structures in any imaging technique. For the purposes of the present invention, the main imaging agent is a luminescence changing agent (upon NIR irradiation), which changes the luminescence upon melting of the PCM, which is induced by NIR radiation. This application could be useful in high-resolution fluorescence microscopy. This is also advantageous because of the deeper penetration of the NIR irradiation on biological tissues.

The photoinduced thermochromic or thermoluminescent compositions structured in capsules, particularly nanocapsules in form of SLPs, are useful as drug delivery system.

In an embodiment, wherein the photoinduced thermochromic or thermoluminescent compositions further comprise one or more pharmaceutical active ingredients, they are useful in therapy. In fact, the delivery of the active ingredient from the SLPs is performed by melting the PCM of the SLPs by irradiation with NIR. The delivery of the active ingredient from the photoinduced thermochromic or thermoluminescent composition can be controlled/modified/prolonged by monitoring the temperature induced by the irradiation with NIR light.

The photoinduced thermochromic or thermoluminescent compositions are also useful in the field of optics. Thus, the use in optics of a:—photoinduced thermochromic or thermoluminescent composition, comprising: a) nanoparticles capable of absorbing near-infrared radiation (NIR) and converting the NIR radiation into heat, in particular metal gold nanoparticles; b) one or more phase change materials (PCM) selected from the group consisting of: b1) a PCM capable of acting as chromic or fluorochromic promoter; and b2) a PCM uncapable of acting as chromic or fluorochromic promoter; c) one or more dyes selected from the group consisting of: c1) a dye capable of modifying its colour- or emission-properties when the PCM changes between the solid state and the liquid state; and c2) a dye uncapable of modifying its colour- or emission-properties when the PCM between the solid state and the liquid state; wherein:—when the PCM is uncapable of acting as chromic or fluorochromic promoter (b2), and the dye is uncapable of modifying its colour- or emission-properties when the PCM changes between the solid state and the liquid state (c2); then the photoinduced thermochromic or thermoluminescent composition further comprises one or more chromic or fluorochromic promoter selected from the group consisting of colour developers, emission quenchers, and emission activators; or alternatively,—when at least the PCM is capable of acting as chromic or fluorochromic promoter (b1) or the dye is capable of modifying its colour- or emission-properties when the PCM changes between the solid state and the liquid state (c1); then the photoinduced thermochromic or thermoluminescent composition optionally comprises (d) one or more chromic or fluorochromic promoter selected from the group consisting of colour developers, emission quenchers, and emission activators; or alternatively—a photoinduced thermochromic or thermoluminescent free-standing film comprising the photoinduced thermochromic or thermoluminescent composition; one or more polymers; and optionally one or more excipients; or alternatively—a photoinduced thermochromic or thermoluminescent article comprising the photoinduced thermochromic or thermoluminescent compositions; or the free-standing film; is also part of the invention.

In an embodiment, the photoinduced thermochromic or thermoluminescent compositions which are transparent can be useful for the preparation of transparent films for optical filters or for the preparation of smart-glass such as smart glasses, car-glasses, facilities/building-windows, mirrors among others. It is also useful for the detection of NIR radiation. In an embodiment, the photoinduced thermochromic or thermoluminescent compositions can be forming part of an optic (medical) device as artificial iris. Examples of optic medical device includes eye prosthesis and soft lens.

It is also part of the invention the use of the compositions, free-standing films and articles of the invention in anti-fake technology. The fifth aspect of the invention relates to the use for anti-fake technology of: a composition photoinduced thermochromic or thermoluminescent composition, comprising: a) nanoparticles capable of absorbing near-infrared radiation (NIR) and converting the NIR radiation into heat, in particular metal gold nanoparticles; b) one or more phase change materials (PCM) selected from the group consisting of: b1) a PCM capable of acting as chromic or fluorochromic promoter; and b2) a PCM uncapable of acting as chromic or fluorochromic promoter; c) one or more dyes selected from the group consisting of: c1) a dye capable of modifying its colour- or emission-properties when the PCM changes between the solid state and the liquid state; and c2) a dye uncapable of modifying its colour- or emission-properties when the PCM between the solid state and the liquid state; wherein:—when the PCM is uncapable of acting as chromic or fluorochromic promoter (b2), and the dye is uncapable of modifying its colour- or emission-properties when the PCM changes between the solid state and the liquid state (c2); then the photoinduced thermochromic or thermoluminescent composition further comprises one or more chromic or fluorochromic promoter selected from the group consisting of colour developers, emission quenchers, and emission activators; or alternatively, when at least the PCM is capable of acting as chromic or fluorochromic promoter (b1) or the dye is capable of modifying its colour- or emission-properties when the PCM changes between the solid state and the liquid state (c1); then the photoinduced thermochromic or thermoluminescent composition optionally comprises (d) one or more chromic or fluorochromic promoter selected from the group consisting of colour developers, emission quenchers, and emission activators; or alternatively, a photoinduced thermochromic or thermoluminescent free-standing film comprising the photoinduced thermochromic or thermoluminescent composition, one or more polymers; and optionally one or more excipients; or alternatively, a photoinduced thermochromic or thermoluminescent article comprising photoinduced thermochromic or thermoluminescent composition; or the free-standing film. Particularly, the photoinduced thermochromic or thermoluminescent compositions can be useful for smart labels for the packaging of high-added value products, invisible watermarks for official documents and NIR-readable invisible taggants.

All the embodiments disclosed above for the photoinduced thermochromic or thermoluminescent compositions disclosed herein, the free-standing films and the articles of the present invention also apply to the use in therapy, cosmetics, diagnostic, optics and anti-fake technology.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples are provided by way of illustration, and they are not intended to be limiting of the present invention. Furthermore, the present invention covers all possible combinations of particular and preferred embodiments described herein.

EXAMPLES

Abbreviations:
  ACQ: aggregation-caused-quenching
  AIE: aggregation-induced-emission
  APTES: 3-aminopropyl)trethoxysilane
  AuNSs: gold nanoshells
  AuNRs: gold nanorods
  BA: bisphenol A
  CV: crystal violet lactone
  DA: dodecanoic acid
  DCA: 9,10-dicyanoantracene
  DMA: N,N-dimethylaniline
  EC: eicosane
  HD: 1-hexadecanol
  MCs: microcapsules
  MNPs: metal nanoparticles
  MS: methyl stearate
  nanoSLPs: solid lipid nanoparticles
  NIAD-4: {[5'-(p-hydroxyphenyl)-2,2'-bithienyl-5-yl]-methylidene}-propanedinitrile
  NIR: near-infrared radiation
  NPs: nanoparticles OC: octacosane
ODA: 1-octadecylamine
PCMs: Phase-Change-Materials
PDI: perylene diimide
PES: polyethersulfone
PR: plum red
PS: polystyrene
PTDI: N,N'-bis(sec-butyl)-1,6,7,12-tetra-(4-tert-butylphenoxy)perylene-3,4:9,10-tetracarboxylic diimide
PVA: polyvinylalcohol
RhB: rhodamine B
RT: room temperature
SA: stearic acid
SiMCs: silica microcapsules
SLPs: solid lipid particles
TD: 1-tetradecanol
$T_g$: glass transition temperature
$T_m$: melting temperature
$T_m$: melting temperature of X PCM
TPE: tetraphenylethene
UV: ultraviolet General Considerations For all examples of the present invention involving fluorescence changes, the emission spectra were recorded through a PTI Quantamaster fluorimeter or through a custom-made spectrofluorometer where an Andor ICCD camera is coupled to a spectrograph. UV light (355 nm) or visible light (450 nm) is used to excite the fluorescent agent to observe its fluorescence. The sample temperature was controlled by varying the temperature of the sample holder. In temperature-dependent fluorescence measurements, the sample is irradiated with the suitable excitation wavelength, while it is kept at above and below the $T_m$ of the PCM. NIR irradiation was carried out with a NIR laser ($\lambda_{exc}$=830 nm, 150 mW, beam diameter=3 mm). For NIR-dependent fluorescence measurements the sample was simultaneously irradiated with the NIR irradiation and with the UV/Vis light, suitable for the fluorescence activation. Time-dependent fluorescence experiments were carried out by measuring the fluorescence at the emission maximum of the dye, before, during (up to reaching the steady state) and after stopping the NIR irradiation.

The measurement of the variation in fluorescence is made applying the following formula:

$$\text{Variation in emission} = \frac{Fl \text{ irradiated} - Fl \text{ dark}}{Fl \text{ dark}} \cdot 100$$

Where FI irradiated and FI dark are the fluorescence emission intensities (calculated through mathematical integration of the emission band) under NIR irradiation and without NIR irradiation, respectively.

For all examples of the present invention involving colour-changing samples, they were characterized by measuring the reflectance spectra of the films/papers. Temperature-dependent experiments were carded out determining the reflectance spectra below and above the $T_m$ of the used PCM. The NIR irradiation effect on the colour change was monitored by measuring the reflectance at $\lambda_{max}$ (in the visible region) of the dye before and after NIR irradiation. Time-dependent reflectance experiments were carried out by measuring the reflectance at the absorption maximum of the dye, before, during (up to reaching the steady state) and after stopping the NIR irradiation.

The measurement of the variation in colour of the films or papers, when using gold nanoparticles is made applying the following formula:

$$\text{Change in } F(R) = \frac{(F(R) \text{ irradiated} - F(R) \text{ AuNPs}) - (F(R) \text{ dark} - F(R) \text{ AuNPs})}{F(R) \text{ dark} - F(R) \text{ AuNPs}} \cdot 100$$

Where F(R) irradiated and F(R) dark are the diffused-reflectance intensities (converted into F(R) values through Kubelka-Munk equation) under NIR irradiation and without NIR irradiation, respectively. F(R) AuNPs is the diffused-reflectance intensity provided by the AuNPs (i.e. AuNRs or AuNSs).

Gold Nanoparticles (AuNPs)
Gold Nanoparticles in Form of Nanoshells (AuNSs)
1. Substrates/Coatings/Films Integrating the Photoinduced Thermoluminescent Composition
1.1. Preparation of Gold Nanoparticles in Form of Nanoshells (AuNSs)

AuNSs were prepared mixing 10 μL of APTES with 4.60 mL of water under stirring (530 rpm) for 10-20 seconds. Then, 320 μL of a 40 mM HAuCl$_4$ aqueous solution were added, obtaining a yellow emulsion due to the poor solubility of APTES in water. The HAuCl$_4$/APTES mixture was stirred for 30 seconds followed by the addition of 400 μL of a 0.1 M aqueous suspension of NaBH$_4$. After the addition of NaBH$_4$, the colour of the mixture changes to deep green and 400 μl of Bovine Serum Albumin 0.1 M aqueous solution were added to stabilize the AuNSs.

1.2. Compositions

The composition of the substrates/coatings/films integrating the photoinduced thermoluminescent compositions of the present invention (example 1-15) is disclosed in Tables below.

Table 1 discloses the types of substrate, the PCMs and the fluorescent agent forming part of the photoinduced thermoluminescent substrates/coatings/films of the present invention (Examples 1-15).

TABLE 1

| Ex | Substrate | PCM/type | Dye | Fluorescent activator/cone | Gold Nanoshell (AuBSs) | | |
|---|---|---|---|---|---|---|---|
| j | | PCM | /Conc* | quencher, | Amount (mg) | surface cone iing/cmj | Wright ratio Nps/PCM (mg/mgaeasy |
| Reversible fluorescent coated papers with PCM/dye mixture and AuNSs | | | | | | | |
| 1 | Paper® | 833 | Rh8/20.6 | | 0.018 | 0.006 | 0.5012 |
| 2 | Paper" | HD | Rh8/20.2 | - | 8.018 | 8.505 | 0,0012 |
| 3 | Paper | SA | RhB/23.5 | - | 0.018 | 0.006 | B.0014 |

TABLE 1-continued

| | | | | | | | |
|---|---|---|---|---|---|---|---|
| 4 | Paperr | EC | TPE/3.9 | | 0.018 | 0,006 | 0.0011 |
| 5 | Paper" | OC | TPE/4 | - | 8.018 | 8.505 | 0,0009 |
| 6 | Paper | ID | NIAD-4/0.2 | - | 0.018 | 0.006 | 0.0008 |
| 7 | Paper | ODA | DCA/0.13 | ODA® | 0.018 | 0.SS | 0.0003 |
| 8 | Paper | 833 | FTDI/0.11 | DMA/7.6 | 3.018 | 0.006 | 0.0001 |
| 9 | Paper | EC | PDI/0.052 | DMA/0.021 | g sis | 0.006 | 0,0003 |
| Beversible fluorescent PVA films with PCM particles and AuNSs | | | | | | | |
| id | PVA fim" | EC/SLPs | TPE | | 0.034 | 0.0655 | 0.0002 |
| 11 | PVA fim | oC/ SLPs | TPE | | 0.843 | 0.0072 | 0,0003 |
| 12 | PVA film"o" | nanoSLPs | TPE | - | 0.068 | 0.01 | 0.146 |
| 13 | PVA film" | MS/ SiNCs | TPE | | 0.283 | 0.014 | 0.0019 |
| Costed cellulose papers for irreversible fluorescence activation, with polymer MPs containing PCM and fluorescent quencher | | | | | | | |
| 14 | Paper | PS-DA/ MPs | Rhe | DA' | 0.005 | 0.005 | 0.0004 |
| 15 | Paper® | PES-DA/ MPs | RhB | DA® | 0.006 | 0.006 | 0,0004 |

(a) Paper substrate is a piece of paper of 3x1 cm$^2$
(b) DA corresponds to the fluorescence activator dodecanoic acid
(c) The concentration is expressed as mg respect to mL of PCM
(d) ODA corresponds to octadecylamine which is both the PCM and the fluorescence quencher
(e) The PVA film of the Example 12 is a transparent PVA film
(f) Film size of 3x2 cm$^2$ area
(g) Film size of 19.6 cm$^2$ (circular shape) area
(h) Paper substrate is a piece of paper of 1x1 cm$^2$ 1.3. Preparation Processes
FOR PAPERS Integrating the Photoinduced Thermoluminescent Composition
General Procedure 1

Example 1: A water solution of AuNSs (0.34 mg/mL) was dropped onto a piece of cellulose paper (3×1 cm$^2$), avoiding leaking of the water onto the substrate. After water evaporation a melted solution (0.05 g) of RhB (20 mg/mL) in TD (the PCM, $T_m$=38° C.) was dropped onto the active paper covering the entire surface. During the addition, the paper was kept above the $T_m^{TD}$ (by using a heating plate) to avoid the fast solidification of the PCM and allow its diffusion through the pores of the paper. The final material contained AuNSs and a solution of TD/RhB (15 mg) homogeneously distributed in the entire paper sheet. As a control experiment a paper without AuNSs was prepared with the same protocol.

The papers integrating the photoinduced thermoluminescent composition of Examples 2, 3, 4, 5, 6 and 7 of the present invention were prepared following the general procedure as defined above for Example 1 but using the components specified in Table 1.

General Procedure 2

Example 8: the paper integrating the photoinduced thermoluminescent composition of Example 8 was prepared following the general process of Example 1 but replacing RhB for a mixture of PTDI (0.11 mg/mL in TD) and DMA (7.6 mg/mL in TD). The final material contains AuNSs and a solution of TD/DMA/PTDI (16 mg) homogeneously distributed in the entire paper surface. As control experiment a paper without AuNSs is prepared with the same protocol.

The paper integrating the photoinduced thermoluminescent composition of Example 9 of the present invention was prepared following the general procedure 2 as defined above for Example 8 but using the components specified in Table 1.

FOR FREE-STANDING FILMS Made by the Polymer Matrix Embedding the Photoinduced Thermoluminescent Composition:

General Procedure 3

Example 10: The film is made by the polymer matrix (PVA) embedding the SLPs of the photoinduced thermoluminescent composition of Example 4 (TPE@EC).

1) SLPs preparation: SLPs are prepared through the emulsification-cooling method. Initially, the molten (>$T_m^{EC}$, 60° C.) TPE@EC solution (3.9 mg/mL or 1 mM, 0.65 mL or 0.5 g) is mixed with the pre-heated (>$T_m^{EC}$, 60° C.) aqueous phase (20 mL), containing the surfactant PVA (200 mg/mL), and emulsified through Ultra-Turrax® high-shear homogenization (3000 rpm, 5 min, 60° C.), to yield TPE@EC microdroplets (15-20 µm). Once the emulsion is prepared, this is quickly transferred into a water solution (30 mL), pre-cooled in an ice bath. The PCM quickly solidifies yielding the TPE@EC SLPs. The SLPs are separated from water by flocculation and washed 2 times with cold clean water (30 mL) through decantation. Afterwards the SLPs are isolated by lyophilisation after freezing the suspension.

2) Film preparation: the obtained SLPs (150 mg) of the previous step are dispersed in aqueous solution (1 mL) of PVA 4-88 (20 wt. %) and 0.25 mL of a previously prepared suspension AuNSs (0.34 mg/mL). The mixture is homogenized through vortex mixing and casted onto a substrate (surface 3×2 cm$^2$). The water is let evaporating at room temperature during 48 h, after which a PVA film with the SLPs and AuNSs embedded in is obtained. The control film without the AuNSs is obtained with the same procedure, but without adding the AuNSs.

The photoinduced thermoluminescent coated substrates of Example 11 of the present invention was prepared following the general procedure 3 as defined above for Example 10 but using the components specified in Table 1 respectively.

General Procedure 4

Example 12: The film is made by the polymer matrix (PVA) embedding the nano-SLPs of the mixture of Example 5 (TPE@OC). The film is transparent because of the size reduction of the SLPs.

1) NanoSLPs preparation: nanoSLPs are prepared through the emulsification-cooling method. Initially, the molten (>$T_m^{oc}$, 80° C.) TPE@OC solution 4 mg/mL or 10 mM, 1.27 mL or 1.00 g) is mixed with the pre-heated (>$T_m^{oc}$, 80° C.) aqueous phase (10 mL) containing the surfactant PVA (100 mg/mL) and emulsified through ultrasonic homogenisation (Branson sonifier, 100% amplitude, 2 min), to yield TPE@OC nanodroplets (50-400 nm). Once the emulsion is prepared, this is quickly transferred into a water solution (20 mL), pre-cooled in an ice bath. The PCM quickly solidifies yielding the TPE@EC SLPs.

2) Film preparation: the obtained suspension (0.05 mL, SLPs concentration=33 mg/mL) is diluted with an aqueous solution (1 mL) of PVA 4-88 (20 wt. %) and 0.25 mL of the previously prepared AuNSs (0.34 mg/mL) homogenized upon stirring and casted onto a substrate/mold. The water is let evaporating at room temperature during 48 h, after which a PVA film with the SLPs and AuNSs embedded in is obtained. The control film without the AuNSs is obtained with the same procedure, without adding the AuNSs.

General Procedure 5

Example 13: The film is made by the polymer matrix (PVA) embedding the PE@MS_SiMCs of the mixture TPE@MS.

1) Microcapsules preparation: SiMCs of TPE@MS are prepared through phase-separation/shell formation. A solution of hydroxyl-silicate pre-polymer (1 g), TPE (1.5 mg) and MS (300 mg) in EtOH (0.25 mL) is prepared by stirring the mixture at 40° C. Once the homogeneous solution is obtained, this is mixed with water at 40° C. and emulsified through Ultra-Turrax® high-shear homogenization (6000 rpm) during 20 min. Afterwards 1 mL of aqueous NH$_3$ (25%) is added and the solution is gently stirred (1000 rpm, magnetic stirring) for 10 min. Then, the solution is left for 1 h without stirring and the capsules are collected by sedimentation and washed with water. Finally, the capsules are dried at room temperature for 12-24 h.

2) Film preparation: the obtained microcapsules are mixed with an aqueous solution (3.3 mL) of PVA 4-88 (20 wt. %) and 0.83 mL previously prepared AuNS suspension (0.34 mg/mL) homogenized upon stirring and casted onto a substrate/mold. The water is let evaporating at room temperature during 24-48 h, after which a PVA film with the SiMCs and AuNSs embedded in is obtained. The control film without the AuNSs is obtained with the same procedure, without adding the AuNSs.

FOR PAPER Integrating the Photoinduced Irreversible Thermoluminescent Composition General Procedure 6

Example 14: The paper is composed by PS nanoparticles containing DA and RhB.

1) PS NPs preparation: PS (0.5 g), DA (50 mg) and RhB-base (10, 2 wt. % respect to the polymer) are dissolved in dichloromethane (5 mL) upon magnetic stirring. Once all the components are dissolved, the final organic mixture is subsequently added to a previously prepared SDS water solution (10 mL, 0.5 wt. %). The mixture is pre-emulsified (T18 Ultra-Turrax® IKA, 1000 rpm) at RT for 60 minutes. The formed pre-emulsion is sonicated for 120 s (Branson Ultrasonic Sonifier, 70% amplitude, 30 s pulse on, 10 s pulse off) to produce the nanoemulsion. The obtained mixture is transferred into a vial and the organic solvent was let to evaporate overnight at RT, inducing the precipitation of the polymer and the encapsulation of the dye and the fluorescent developer in the NPs.

2) Paper preparation: PS NPs powder is dispersed in water (60 mg/ml) containing AuNSs (0.024 mg/ml) and is dropped (0.25 ml) onto the surface of the paper (1×1 cm$^2$), obtaining a homogeneous distribution of the NPs (15 mg/cm$^2$) and the AuNSs. As control experiment a paper without AuNSs is prepared with the same protocol.

The photoinduced thermoluminescent coated substrates of Examples 15 of the present invention was prepared following the general procedure 6 as defined above for Example 14 but using the components specified in Table 1.

1.4. Results

The effect in the fluorescence change upon irradiation of the photoinduced thermoluminescent compositions (Examples 1-15) of the present invention with a NIR radiation of a wavelength from 600 nm to 1200 nm is shown in Tables 2 and 3 below. The fluorescence is measured by irradiating the compositions close to the respective absorption maxima.

Tables 2 and 3 show the effect in the fluorescence activation (OFF/ON examples) and quenching (ON/FF examples) upon NIR irradiation and the reversibility of the effect.

TABLE 2

| Ex | NIR laser (nm)<[a]> | Effect upon NIR | Reversibility | AF (NIR) | AF (heating) (b) | t1/2 activation (c) | t1/2 deactivation (d) |
|---|---|---|---|---|---|---|---|
| 1 | 830 | OFF/ON | Yes | 512% | 882% | 1.3s | 12.2 s |
| 2 | 830 | OFF/ON | Yes | 654% | 609% | 1.1s | 4.3 s |
| 3 | 830 | OFF/ON | Yes | 808% | 737% | 1.4s | 2.0 s |
| 4 | 830 | ON/OFF | Yes | -96% | -83% | 0.9 s | 8.1 s |
| 5 | 830 | ON/OFF | Yes | -97% | -90% | 1.0s | 2.5 s |
| 6 | 830 | ON/OFF | Yes | -75% | -65% | 1.3s | 9.3 s |
| 7 | 830 | ON/OFF | Yes | -98% | -94% | 1.0s | 2.3 s |
| 8 | 830 | OFF/ON | Yes | 789% | 570% | 0.9 s | 13.2 s |
| 9 | 830 | OFF/ON | Yes | 820% | 501% | 0.9 s | 14.9 s |
| 10 | 830 | ON/OFF | Yes | -97% | -92% | 2.0 s | 3.2 s |
| 11 | 830(8) | ON/OFF | Yes | -95% | -96% | 1.9s | 1.2s |
| 12 | 830<[a]> | ON/OFF | Yes | -80% | -68% | 1.8s | 1.1 s |

TABLE 2-continued

| | | | | | | | |
|---|---|---|---|---|---|---|---|
| 13 | 830[a] | ON/OFF | Yes | −74% | −65% | 1.9s | 1.3s |
| 14 | 830 | OFF/ON | No | 789% | 450% | 1.5s | No |
| 15 | 830 | OFF/ON | No | 453% | 321% | 2s | No |

(a) NIR laser irradiation: Aexc = 830nm, Power = 150mW, beam diameter: 3mm; (b) AF obtained upon thermal heating (above the $T_m$ of the PCM or, for the Examples 14 and 15, above the $T_g$ of the polymer) of materials (papers or films) prepared as in the reported examples but without AuNSs; (c) time of NIR irradiation required to the material to reach i) half of the initial emission intensity (for the on/off systems) or ii) half of the emission intensity achievable at the photostationary state (for the off/on systems); (d) time required to the material to reach, in the dark (without NIR irradiation) i) half of the final emission intensity (for the on/off systems) or ii) half of the emission intensity reached at the photostationary state before stopping the NIR irradiation (for the off/on systems).

TABLE 3

Ex. NIR irradiation effect in the fluorescence

1. Before NIR irradiation the paper shows negligible fluorescence while shined with the UV light (355 nm). When the paper is irradiated with the NIR laser ($\lambda_{exc}$ = 830 nm), the fluorescence ($\lambda_{max}$ = 575 nm) is instantaneously (<2 s) produced only in the regions where the paper is irradiated with NIR. The fluorescence increase upon NIR irradiation was 512%. This fluorescence quickly disappears (<25 s) when the NIR irradiation is stopped. The localized fluorescence activation (only in the region of the NIR beam) is explained by the instantaneous increase of the temperature (above $T_m^{TD}$ = 38° C.) caused by the photothermal effect of the AuNSs present in the paper. A paper prepared as above, but without the AuNSs only changes its fluorescence when heated, while it does not when irradiated with NIR.
2. The effect is analogous to Example 1
3. The effect is analogous to Example 1
4. Before NIR irradiation, fluorescence is observed ($\lambda_{max}$ = 458 nm) from all the surface of the paper, while shined with the UV light (355 nm). When the paper is irradiated with the NIR laser ($\lambda_{exc}$ = 830 nm, 150 mW, beam diameter = 3 mm), the fluorescence is instantaneously (<2 s) quenched only in the regions where the paper is irradiated with NIR. This fluorescence immediately appears (<9 s) when the NIR irradiation is stopped and recovers completely in <20 s. The localized fluorescence quenching (only in the spot of the NIR beam) is explained by the instantaneous increase of the temperature (above $T_m^{EC}$ = 37° C.) caused by the photothermal effect of the AuNSs present in the paper($\Delta F$ = −96%). A paper, prepared as above, but without the AuNSs only changes its fluorescence when heated, but not when irradiated with NIR.
5. The effect is analogous to Example 4
6. The effect is analogous to Example 4
7. The effect is analogous to Example 4
8. The effect is analogous to Example 1
9. The effect is analogous to Example 1
10. The effect is analogous to Example 4
11. The effect for the transparent film of Ex. 11 is analogous to Example 4
12. The effect is analogous to Example 4
13. The effect is analogous to Example 4
14. Under no NIR irradiation, the paper shows negligible fluorescence while shined with the UV light (355 nm). When the paper is irradiated with the NIR laser ($\lambda_{exc}$ = 830 nm), the fluorescence is quickly (<5 s) activated ($\lambda_{max}$ = 615 nm) in the regions where the paper is heat by NIR radiation. This fluorescence ($\lambda_{max}$ = 615 nm) remains constant once the NIR radiation is stopped (irreversible). The localized fluorescence activation (only in the spot of the NIR beam) is explained by the instantaneous increase of the temperature (above $T_g^{PS}$ = 100° C.) caused by the photothermal effect of the AuNSs present in the paper ($\Delta F$ = 789%). A paper, prepared as above, but without the AuNSs only activates its fluorescence when heated above the $T_g$ of the polymer, but not when irradiated with NIR.
15. The effect is analogous to Example 14

2. Substrates/Coatings/Films Integrating the Photoinduced Thermochromic Coated Substrate Compositions 2.1. Compositions The composition of the photoinduced thermochromic coated substrates of the present invention (example 16-25) are disclosed in Table 4.

Table 4 discloses the type of substrate, the PCM and the type of dye forming part of the photoinduced thermochromic coated substrates of the present invention (Examples 16-25). Table 4 also discloses the presence of PCM structure.

TABLE 4

| Ex | Substrate (a) | PCM/ PCM conc(c) structure/ | Dye (c) /conc | colour /conc(c) developer | Gold Nanoshells AuNSs | | |
|---|---|---|---|---|---|---|---|
| | | | | | Amount (mg) | Distribution (mg/cm²) | Weight ratio NPs/PCM (mg/mgpcM) |
| Colour changing papers with mixture of PCM, dye and colour developer | | | | | | | |
| 16 | Papera) | TD | CV | BA | 0.018 | 0.006 | 0.0008 |
| Colour changing papers with MCs of PCM, dye and colour developer | | | | | | | |
| 17 | Papera) | TD/MCs | CV | BA | 0.018 | 0.006 | 0.00072 |
| 18 | Papera) | TD/MCs | PR | TD/1%) | 0.018 | 0.006 | 0.00072 |
| 19 | Papera) | Unknown/ BT40 MCs | blue | unknown | 0.018 | 0.006 | 0.00072 |
| 20 | Papera) | Unknown/ LT65 MCs | black | unknown | 0.018 | 0.006 | 0.00072 |
| Colour changing PVA films with ICs of PCM, dye and colour developer | | | | | | | |
| 21 | PVAfilmM | TD/MCs | CV | BA | 0.283 | 0.014 | 0.00057 |
| 22 | PVA film<e> | TD/SLPs | PR | No | 0.085 | 0.014 | 0.00062 |
| 23 | PVAfilm(e) | TD/MCs (1%TD<b>) | PR | No | 0.085 | 0.014 | 0.00061 |
| 24 | PVAfilmM | Unknown/ BT40 MCs0 | blue | unknown | 0.283 | 0.014 | 0.0056 |
| 25 | PVAfilmM | | Unknown/ LT65 MCs | black | unknown | 0.283 | 0.014 |

(a) 0 — Paper substrate is a piece of paper of 3x1 cm²
(b) — The concentration of TD is expressed in weight percent
(c) — The concentration is expressed in mg respect to mL of PCM
(d) — The PVA matrix has a 19.6 cm² area
(e) — The PVA matrix has a 3x2 cm² area
(f) — Commercially available; composition is not specified 2.2. Preparation Processes
FOR PAPERS Integrating the Photoinduced Thermochromic Composition
General Procedure 7

Example 16: The paper integrating the photoinduced thermochromic composition of Example 16 was prepared following the general procedure 1 as defined above for Example 1. After the water evaporation the melted solution (0.05 g) of BA (47 mg/mL) and CV (12 mg/mL) in TD ($T_m$=38° C.) is dropped onto the active paper covering the entire surface. The final material contains AuNSs and a solution of TD/BA/CV (23 mg) homogeneously distributed in the entire paper surface. As control experiment a paper without AuNSs is prepared with the same protocol.
General Procedure 8

Example 17

Microcapsules preparation: PES MCs of (BA+CV)@TD are prepared through phase-separation/solvent evaporation. A solution of PES (250 mg), CV (7 mg), BA (28 mg) and TD (500 mg) in $CHCl_3$ (5 mL) is prepared by stirring the mixture at room temperature. Once the homogeneous solution is obtained, this is mixed with an aqueous solution of surfactant (PVA, 200 mg/mL) and emulsified through Ultra-Turrax® high-shear homogenisation (5000 rpm) during 15 min. After this time, the $CHCl_3$ is evaporated in a rotary evaporator yielding the PES MCs (15-20 μm).

Paper Preparation: AuNSs obtained above are deposited onto the paper sheet (3×1 cm²). When the water is evaporated, the obtained [CV+BA]@TD@PES_MCs suspension (75 mg MCs/mL) is dropped (0.2 mL) to the previously cellulose paper. As control experiment a paper without AuNSs is prepared with the same protocol.

The photoinduced thermochromic coated substrates of Examples 18, 19 and 20 of the present invention was prepared following the general procedure 8 as defined above for Example 17 but using the components specified in Table 4.

FOR FREE-STANDING FILMS Made by the Polymer Matrix Embedding the Photoinduced Thermochromic Composition
General Procedure 9

Example 21

Microcapsules preparation: PES MCs were prepared following the process disclosed in general procedure 8 for Example 17.

Film preparation: the obtained [CV+BA]@TD@PES_MCs suspension (75 mg MCs/mL) is mixed with an aqueous solution (3.3 mL) of PVA 4-88 (20 wt. %) and 0.83 mL of a previously prepared stock AuNS suspension (0.34 mg/mL), homogenized upon stirring and casted onto a substrate/mold. The water is let evaporating at room temperature during 24-48 h, after which a PVA film with the MCs and AuNSs embedded in is obtained. The control film without the AuNSs is obtained with the same procedure, without adding the AuNSs.

The photoinduced thermochromic coatings/films of Examples 22, 23, 24 and 25 of the present invention was prepared following the general procedure 9 as defined above for Example 21 but using the components specified in Table 4.

2.3. Results

The effect in the colour change upon irradiation of the photoinduced thermochromic compositions (Examples 16-25) of the present invention with an infrared light of a wavelength from 600 nm to 1200 nm is show in Tables 5 and 6 below Tables 5 and 6 show the effect in the colour appearance (ON/FF examples) and disappearance (OFF/ON) upon NIR irradiation and the reversibility of the effect.

TABLE 5

| Ex. | NIR laser (nm) (a) | Effect upon NIR | Reversibility | ΔF(R) (NIR) | ΔF(R) (heating) (b) | t1/2 activation (c) | t1/2 deactivation (d) |
|---|---|---|---|---|---|---|---|
| 16 | 830 | ON/OFF | Yes | -99% | -99% | 0.8 s | 9.3 s |
| 17 | 830 | ON/OFF | Yes | -95% | -99% | 1.3s | 4.2 s |
| 18 | 830 | OFF/ON | Yes | 643% | 621% | 1.2s | 6.1 s |
| 19 | 830 | ON/OFF | Yes | -96% | -96%e) | 1.0s | 2.5 s |
| 20 | 830 | ON/OFF | Yes | -95% | -94(e) | 1.1 s | 3.1 s |
| 21 | 830 | ON/OFF | Yes | -95% | -99% | 0.9 s | 8.2 s |
| 22 | 830 | OFF/ON | Yes | 702% | 800% | 1.6s | 3.6 s |
| 23 | 830 | OFF/ON | Yes | 505% | 578% | 1.3s | 3.1 s |
| 24 | 830 | ON/OFF | Yes | -91% | -97%e) | 1.0s | 2.8 s |
| 25 | 830 | ON/OFF | Yes | -91% | -94%e) | 1.5s | 3.0 s |

(a) NIR laser irradiation: λexc = 830nm, Power = 150mW, beam diameter: 3mm; (b) ΔF(R) obtained upon thermal heating (above the Tm of the PCM) of materials (papers or films) prepared as in the reported examples but without AuNSs; (c) time of NIR irradiation required to the material to reach i) half of the initial color intensity (for the on/off systems) or ii) half of the color intensity achievable at the photostationary state (for the off/on systems); (d) time required to the material to reach, in the dark (without NIR irradiation) i) half of the final color intensity (for the on/off systems) or ii) half of the color intensity reached at the photostationary state before stopping the NIR irradiation (for the off/on systems); (e) though the composition is not specified, it is known that the capsules should contain PCM with Tm around 40 (BT40) and 65 °C (LT65).

TABLE 6

| Ex. | NIR irradiation effect in the absorption properties (colour) |
|---|---|
| 16 | Before NIR irradiation the paper shows blue colour ($\lambda_{max}$ = 630 nm). When the paper is irradiated with the NIR laser ($\lambda_{exc}$ = 830 nm), the blue colour is instantaneously (<2 s) lost only in the regions where the paper is irradiated with NIR radiation (ΔF (R) = −99%). This colour ($\lambda_{max}$ = 630 nm) quickly reappears (<20 s) when the NIR irradiation is stopped. The localised colour fading (only in the spot of the NIR beam) is explained by the instantaneous increase of the temperature (above $T_m^{TD}$ = 38° C.) caused by the photothermal effect of the AuNSs present in the paper. A paper, prepared as above, but without the AuNSs only changes its colour when heated, but not when irradiated with NIR. |
| 17 | The effect is analogous to Example 16 |
| 18 | Without NIR irradiation the paper shows no colour ($\lambda_{max}$ = 580 nm). When the paper is subjected to NIR laser ($\lambda_{exc}$ = 830 nm), the blue colour ($\lambda_{max}$ = 580 nm) instantaneously (<2 s) appears only in the irradiated regions of the paper (ΔF (R) = 643%). This colour quickly fades (<20 s) when the NIR irradiation is stopped. The localized colouration (only in the spot of the NIR beam) is explained by the instantaneous increase of the temperature (above $T_m^{TD}$ = 38° C.) caused by the photothermal effect of the AuNSs present in the paper. A paper, prepared as above, but without the AuNSs only changes its colour when heated, but not when irradiated with NIR. |
| 19 | The effect is analogous to Example 16. |
| 20 | The effect is analogous to Example 19, but with the colour reversibly changes from black to colourless and overcoming 65° C. |
| 21 | The effect is analogous to Example 16. |
| 22 | The effect is analogous to Example 18. |
| 23 | The effect is analogous to Examples 18 and 22. |
| 24 | The effect is analogous to Example 19. |
| 25 | The effect is analogous to Example 20. |

The results disclosed above show that the photoinduced thermochromic or thermoluminescent compositions are useful for the preparation of photoinduced thermochromic or thermoluminescent coated substrates having an improved thermochromic and thermoluminescent behaviour. In particular, it is confirmed that the irradiation of the compositions of the present invention comprising photothermal metal nanoparticles capable of absorbing selectively light of a wavelength from 600 nm to 1200 nm; one or more PCMs; and one or more dyes, or alternatively one or more fluorescent agents, with a low-power density and low-energy radiation allows having a fast, uniform, intense colour or fluorescent change without compromising the viability and reversibility of the smart material.

Gold Nanoparticles in Form of Nanorods (AuNRs)

3. Substrates/Coatings/Films Integrating the Photoinduced Thermoluminescent Composition 3.1. Preparation of Gold Nanoparticles in Form of Nanorods (AuNRs)

AuNRs (9-15 nm diameter, 55-65 nm length, dispersed in water, with absorption maximum at 850 nm, positively charged) were purchased from Alfa Aesar.

3.2. Compositions

The composition of the substrates/coating integrating the photoinduced thermoluminescent and photoinduced thermochromic composition containing AuNRs of the present invention (examples 26-27) is disclosed in Table 7 below.

TABLE 7

| Ex | Substrate (a) | PCM/ PCM conc[b] structure/ | Dye (b) /conc[b] /cone | colour /conc[b] developer | Gold Nanorods AuNRs Amount (mg) | Distribution (mg/cm$^2$) | Weight ratio NPs/PCM (mg/mgpcM) |
|---|---|---|---|---|---|---|---|
| Reversible fluorescent coated papers with PCM/dye mixture | | | | | | | |
| 26 | Paper a) | TD | RhB/20.6 | - | 0.009 | 0.003 | 0.0004 |
| Colour changing papers with mixtures of PCM, dye and colour developer | | | | | | | |
| 27 | Paper a) | TD | CV/12 | BA/47 | 0.009 | 0.003 | 0.0004 |

(a) Paper substrate is a piece of paper of 3x1 cm$^2$
(b) The concentration is expressed as mg respect to mL of PCM 3.3. Preparation Processes
FOR PAPERS Integrating the Photoinduced Thermoluminescent Composition
General Procedure 10

Example 26: the paper integrating the photoinduced thermoluminescent composition of Example 26 was prepared following the general process of Example 1 but replacing AuNSs for AuNRs. The final material contains AuNRs and a solution of TD/RhB (15 mg) homogeneously distributed in the entire paper sheet. As control experiment a paper without AuNRs is prepared with the same protocol.

General Procedure 11

Example 27: The paper integrating the photoinduced thermochromic composition of Example 27 was prepared following the general procedure 10 as defined for Example 26 but replacing the RhB for BA (47 mg/mL) and CV (12 mg/mL). The final material contains AuNRs and a solution of TD/BA/CV (23 mg) homogeneously distributed in the entire paper surface. As control experiment a paper without AuNRs is prepared with the same protocol.

3.4. Results

The effect in the fluorescence change upon irradiation of the photoinduced thermoluminescent composition (Example 26) and the effect in the colour change upon irradiation of the photoinduced thermochromic composition (Example 27) of the present invention with a NIR radiation of wavelength from 600 nm to 1200 nm is shown in Tables 8 and 9 below.

Tables 8 and 9 show the effect on the fluorescence appearance (OFF/ON, Example 26) and color disappearance (ON/OFF, Example 27) upon NIR irradiation and the reversibility of the effect.

TABLE 8

| Ex. | NIR laser (nm) (a) | Observed change | Effect upon NIR | Reversibility | AF or AF(R) (NIR) | AF or AF(R) (heating) (b) | t1/2 activation (c) | t1/2 deactivation (d) |
|---|---|---|---|---|---|---|---|---|
| 26 | 830 | Fluorescence | OFF/ON | Yes | 678% | 984% | 1.9 s | 13.4 s |
| 27 | 830 | Colour | ON/OFF | Yes | -96% | -99% | 2.2 s | 9.4 s |

(a) NIR laser irradiation: λexo = 830nm, Power = 150mW, beam diameter: 3mm;
(b) AF and AF(R) obtained upon thermal heating (above the Tm of the PCM) of materials (papers) prepared as in the reported examples but without AuNRs;
(c) time of NIR irradiation required for the material to reach i) half of the initial emission/colour intensity (for the on/off systems) or ii) half of the emission/colour intensity achievable at the photostationary state (for the off/on systems);
(d) time required for the material to reach, in the dark (without NIR irradiation) i) half of the initial emission/colour intensity (for the on/off systems) or ii) half of the emission/colour intensity reached at the photostationary state before stopping the NIR irradiation (for the off/on systems).

TABLE 9

Ex.

NIR irradiation effect in the fluorescence

26 The effect is analogous to Example 1. Before NIR irradiation the paper shows negligible fluorescence while shined with the UV light (355 nm). When the paper is irradiated with the NIR laser ($\lambda_{exc}$ = 830 nm), the fluorescence ($\lambda_{max}$ = 575 nm) is instantaneously (<2 s) produced only in the regions where the paper is irradiated with NIR. The fluorescence increase upon NIR irradiation was 678%. This fluorescence quickly disappears (<30 s) when the NIR irradiation is stopped. The localized fluorescence activation (only in the region of the NIR beam) is explained by the instantaneous increase of the temperature (above $T_m^{TD}$ = 38° C.) caused by the photothermal effect of the AuNRs present in the paper. A paper prepared as above, but without the AuNRs only changes its fluorescence when heated, while it does not when irradiated with NIR.
NIR irradiation effect in the color 27 The effect is analogous to Example 16. Before NIR irradiation the paper shows blue colour ($\lambda_{max}$ = 630 nm). When the paper is irradiated with the NIR laser ($\lambda_{exc}$ = 830 nm), the blue colour is instantaneously (<3 s) lost only in the regions where the paper is irradiated with NIR radiation (ΔF TABLE 9-continued

| Ex. |
| --- |
| (R) = −96%). This colour ($\lambda_{max}$ = 630 nm) quickly reappears (<20 s) when the NIR irradiation is stopped. The localised colour fading (only in the spot of the NIR beam) is explained by the instantaneous increase of the temperature (above $T_m^{TD}$ = 38° C.) caused by the photothermal effect of the AuNRs present in the paper. A paper, prepared as above, but without the AuNRs only changes its colour when heated, but not when irradiated with NIR |

For reasons of completeness, various aspects of the invention are set out in the following numbered clauses:

Clause 1. A photoinduced thermochromic or thermoluminescent composition, comprising:
- a) nanoparticles capable of absorbing near-infrared radiation (NIR) and converting the NIR radiation into heat;
- b) one or more phase change materials (PCM) selected from the group consisting of:
  - b1) a PCM capable of acting as chromic or fluorochromic promoter; and
  - b2) a PCM uncapable of acting as chromic or fluorochromic promoter;
- c) one or more dyes selected from the group consisting of:
  - c1) a dye capable of modifying its colour- or emission-properties when the PCM changes between the solid state and the liquid state; and
  - c2) a dye uncapable of modifying its colour- or emission-properties when the PCM between the solid state and the liquid state;

wherein:
  when the PCM is uncapable of acting as chromic or fluorochromic promoter (b2), and the dye is uncapable of modifying its colour- or emission-properties when the PCM changes between the solid state and the liquid state (c2); then the photoinduced thermochromic or thermoluminescent composition further comprises one or more chromic or fluorochromic promoter selected from the group consisting of colour developers, emission quenchers, and emission activators;

or alternatively,
  when at least the PCM is capable of acting as chromic or fluorochromic promoter (b1) or the dye is capable of modifying its colour- or emission-properties when the PCM changes between the solid state and the liquid state (c1); then the photoinduced thermochromic or thermoluminescent composition optionally comprises (d) one or more chromic or fluorochromic promoter selected from the group consisting of colour developers, emission quenchers, and emission activators.

Clause 2. The composition according to clause 1, which is selected from the group consisting of:
- a) nanoparticles capable of absorbing NIR radiation and converting the NIR radiation into heat;
- b) one or more PCMs (PCM) capable of acting as chromic or fluorochromic promoter (b1);
- c) one or more dyes uncapable of modifying its colour- or emission-properties when the PCM changes from between the solid state and the liquid state (c2); and
- optionally, d) one or more chromic or fluorochromic promoter selected from the group consisting of colour developers, emission quenchers, and emission activators;

- a) nanoparticles capable of absorbing NIR radiation and converting the NIR radiation into heat;
- b) one or more PCMs (PCM) uncapable of acting as chromic or fluorochromic promoter (b2);
- c) one or more dyes capable of modifying its colour- or emission-properties when the PCM changes between the solid state and the liquid state (c1); and
- optionally, d) one or more chromic or fluorochromic promoter selected from the group consisting of colour developers, emission quenchers, and emission activators;

- a) nanoparticles capable of absorbing NIR radiation and converting the NIR radiation into heat;
- b) one or more PCMs (PCM) capable of acting as chromic or fluorochromic promoter (b1);
- c) one or more dyes capable of modifying its colour- or emission-properties when the PCM changes between the solid state and the liquid state (c1); and
- optionally, d) one or more chromic or fluorochromic promoter selected from the group consisting of colour developers, emission quenchers, and emission activators;

and
- a) nanoparticles capable of absorbing NIR radiation and converting the NIR radiation into heat;
- b) one or more PCMs (PCM) uncapable of acting as chromic or fluorochromic promoter (b2);
- c) one or more dyes uncapable of modifying its colour- or emission-properties when the PCM changes between the solid state and the liquid state (c2); and
- d) one or more chromic or fluorochromic promoter selected from the group consisting of colour developers, emission quenchers, and emission activators.

Clause 3. The composition according to any of the clauses 1 or 2, wherein the nanoparticles (a) are capable of absorbing NIR radiation from 600 nm to 2200 nm.

Clause 4. The composition according to any of the clauses 1-3, wherein the nanoparticles (a) are metal nanoparticles.

Clause 5. The composition according to clauses 4, wherein the particle size of the metal nanoparticles is from 5 to 500 nm.

Clause 6. The composition according to any of the clauses 4 or 5, wherein the amount of metal nanoparticles is from 0.00005 to 0.5 mg per mg of PCM.

Clause 7. The composition according to any of the clauses 4-6, wherein the metal nanoparticles are in a form selected from the group consisting of nanospheres, nanostars, nanodumbells, nanotubes, nanoshells, nanorods, nanocages, nano-half-shells, nanodomes and nanopyramids.

Clause 8. The composition according to any of the clauses 4-7, wherein the metal of the metal nanoparticles is selected from the group consisting of gold, platinum, palladium, silver, copper, aluminium, an alloy thereof, an oxide thereof, and a mixture thereof.

Clause 9. The composition according to any of the clauses 1-8, wherein:
  the PCM is a PCM capable of acting as chromic or fluorochromic promoter (b1) selected from the group consisting of an acid-containing compound, an amine-containing compound, a sulphur-containing compound, an alcohol-containing compound and a mixture thereof; or alternatively, the PCM is a PCM uncapable of acting as chromic or fluorochromic promoter (b2) selected from the group consisting of $(C_8-C_{52})$alkane-based PCM, $(C_{14}-C_{50})$alkene-based PCM, $(C_{14}-C_{50})$alkyne-based PCM and a mixture thereof.

Clause 10. The composition according to any of the clauses 1-9, wherein:

the dye is a dye capable of modifying its colour- or emission-properties when the PCM changes between the solid state and the liquid state (c1) selected from the group consisting of dyes changing their colour and/or emission properties depending on the aggregation/proximity state, temperature sensitive dyes, and dyes changing their colour and/or emission properties depending on the medium viscosity/rigidity;

or alternatively the dye is a dye uncapable of modifying its colour- or emission-properties when the PCM changes between the solid state and the liquid state (c2) selected from the group consisting of charge-transfer dyes (redox dyes), pH-responsive dyes, polarity dependent dyes, pH sensitive luminescent dye, and a redox luminescent agent.

Clause 11. The composition according to any of the clauses 1-10, wherein:

the chromic or fluorochromic promoter is a colour developer selected from the group consisting of an acid, a base, a hydrogen-bonding compound, an electron transfer compound, a mixture thereof; or alternatively, the chromic or fluorochromic promoter is an emission quencher selected from the group consisting of resonance energy transfer quencher, triplet quencher, electron-transfer quencher, and a mixture thereof; or alternatively, the chromic or fluorochromic promoter is an emission activator selected from the group consisting of singlet, triplet sensitizer, fluorescence resonance energy transfer sensitizer and electron-transfer sensitizer, and a mixture thereof.

Clause 12. The composition according to any of the clauses 1-11, further comprising one or more additional components selected from the group consisting of pharmaceutical active ingredients and reactive oxygen species.

Clause 13. A photoinduced thermochromic or thermoluminescent free-standing film comprising the photoinduced thermochromic or thermoluminescent composition as defined in any of the clauses 1-12; one or more polymers; and optionally one or more excipients.

Clause 14. A photoinduced thermochromic or thermoluminescent article comprising the compositions as defined in any of the clauses 1-12; or alternatively the free-standing film as defined in clause 13.

Clause 15. The article according to clause 14, which is selected from the group consisting of:

(A) a photoinduced thermochromic or thermoluminescent coated article comprising:
a substrate; and
a photoinduced thermochromic or thermoluminescent coating deposited on the surface of the substrate, wherein: the coating comprises the composition as defined in any of the clauses 1-12; and optionally one or more polymers.

(B) a photoinduced thermochromic or thermoluminescent embedded article comprising:
a porous substrate;
a photoinduced thermochromic or thermoluminescent composition as defined in any of the clauses 1-12 embedded in the porous substrate; and
optionally, one or more additional external coatings.
and (C) a photoinduced thermochromic or thermoluminescent free-standing film containing article, which comprises one or more photoinduced thermochromic or thermoluminescent free-standing film as defined in clause 13.

The invention claimed is:

1. A photoinduced thermochromic or thermoluminescent composition, comprising:
a) nanoparticles capable of absorbing near-infrared radiation (NIR) and converting the NIR radiation into heat;
b) one or more phase change materials (PCM) selected from the group consisting of:
b1) a PCM capable of acting as chromic or fluorochromic promoter; and
b2) a PCM uncapable of acting as chromic or fluorochromic promoter;
c) one or more dyes selected from the group consisting of:
c1) a dye capable of modifying its colour or emission properties when the PCM changes between a solid state and a liquid state; and
c2) a dye uncapable of modifying its colour or emission properties when the PCM changes between the solid state and the liquid state;
wherein:
when the PCM is uncapable of acting as chromic or fluorochromic promoter (b2), and the dye is uncapable of modifying its colour or emission properties when the PCM changes between the solid state and the liquid state (c2), then the photoinduced thermochromic or thermoluminescent composition further comprises one or more chromic or fluorochromic promoters selected from the group consisting of colour developers, emission quencher, and emission activators;
or alternatively,
when at least the PCM is capable of acting as chromic or fluorochromic promoter (b1) or the dye is capable of modifying its colour or emission properties when the PCM changes between the solid state and the liquid state (c1), then the photoinduced thermochromic or thermoluminescent composition optionally comprises one or more chromic or fluorochromic promoter selected from the group consisting of colour developers, emission quenchers, and emission activators; and
wherein the nanoparticles (a) are metal gold nanoparticles capable of absorbing near-infrared radiation (NIR) and converting the NIR radiation into heat.

2. The composition according to claim 1, which is selected from the group consisting of:
a) nanoparticles capable of absorbing NIR radiation and converting the NIR radiation into heat;
b) one or more PCMs (PCM) capable of acting as chromic or fluorochromic promoter (b1);
c) one or more dyes uncapable of modifying its colour or emission properties when the PCM changes from between the solid state and the liquid state (c2); and optionally, d) one or more chromic or fluorochromic promoter selected from the group consisting of colour developers, emission quenchers, and emission activators;
a) nanoparticles capable of absorbing NIR radiation and converting the NIR radiation into heat;
b) one or more PCMs (PCM) uncapable of acting as chromic or fluorochromic promoter (b2);
c) one or more dyes capable of modifying its colour or emission properties when the PCM changes between the solid state and the liquid state (c1); and
optionally, d) one or more chromic or fluorochromic promoter selected from the group consisting of colour developers, emission quenchers, and emission activators;
a) nanoparticles capable of absorbing NIR radiation and converting the NIR radiation into heat;
b) one or more PCMs (PCM) capable of acting as chromic or fluorochromic promoter (b1);
c) one or more dyes capable of modifying its colour or emission properties when the PCM changes between the solid state and the liquid state (c1); and
optionally, d) one or more chromic or fluorochromic promoter selected from the group consisting of colour developers, emission quenchers, and emission activators;
and
a) nanoparticles capable of absorbing NIR radiation and converting the NIR radiation into heat;
b) one or more PCMs (PCM) uncapable of acting as chromic or fluorochromic promoter (b2);
c) one or more dyes uncapable of modifying its colour or emission properties when the PCM changes between the solid state and the liquid state (c2); and
d) the composition comprising one or more chromic or fluorochromic promoter selected from the group consisting of colour developers, emission quenchers, and emission activators.

3. The composition according to claim 1, wherein the nanoparticles (a) are capable of absorbing NIR radiation from 600 nm to 2200 nm.

4. The composition according to claim 3, wherein the particle size of the nanoparticles is from 5 to 500 nm.

5. The composition according to claim 1, wherein the amount of the nanoparticles is from 0.00005 to 0.5 mg per mg of PCM.

6. The composition according to claim 1, wherein the nanoparticles are in a form selected from the group consisting of nanospheres, nanostars, nanodumbells, nanotubes, nanoshells, nanorods, nanocages, nano-half-shells, nanodomes and nanopyramids.

7. The composition according to claim 6, wherein the nanoparticles are in a form selected from the group consisting of nanospheres, nanoshells and nanorods.

8. The composition according to claim 1, wherein:
the PCM is a PCM capable of acting as chromic or fluorochromic promoter (b1) selected from the group consisting of an acid-containing compound, an amine-containing compound, a sulphur-containing compound, an alcohol-containing compound and a mixture thereof;
or alternatively,
the PCM is a PCM uncapable of acting as chromic or fluorochromic promoter (b2) selected from the group consisting of $(C_8-C_{52})$alkane-based PCM, $(C_{14}-C_{50})$alkene-based PCM, $(C_{14}-C_{50})$alkyne-based PCM and a mixture thereof.

9. The composition according to claim 8, wherein:
the PCM is a PCM capable of acting as chromic or fluorochromic promoter (b1) selected from the group consisting of an acid-containing compound, an amine-containing compound, a sulphur-containing compound, an alcohol-containing compound and a mixture thereof;
or alternatively,
the PCM is a PCM uncapable of acting as chromic or fluorochromic promoter (b2) is one or more $(C_8-C_{52})$ alkane-based PCM.

10. The composition according to claim 1, wherein:
the dye is a dye capable of modifying its colour or emission properties when the PCM changes between the solid state and the liquid state (c1) selected from the group consisting of dyes changing their colour and/or emission properties depending on the aggregation/proximity state, temperature sensitive dyes, and dyes changing their colour and/or emission properties depending on the medium viscosity/rigidity,
or alternatively
the dye is a dye uncapable of modifying its colour or emission properties when the PCM changes between the solid state and the liquid state (c2) selected from the group consisting of charge-transfer dyes, redox dyes, pH-responsive dyes, polarity dependent dyes, pH sensitive luminescent dye, and a redox luminescent agent.

11. The composition according to claim 1, wherein:
the chromic or fluorochromic promoter is a colour developer selected from the group consisting of an acid, a base, a hydrogen-bonding compound, an electron transfer compound, and a mixture thereof; or alternatively,
the chromic or fluorochromic promoter is an emission quencher selected from the group consisting of resonance energy transfer quencher, triplet quencher, electron-transfer quencher, and a mixture thereof; or alternatively,
the chromic or fluorochromic promoter is an emission activator selected from the group consisting of singlet, triplet sensitizer, fluorescence resonance energy transfer sensitizer and electron-transfer sensitizer, and a mixture thereof.

12. The composition according to claim 1, further comprising one or more additional components selected from the group consisting of pharmaceutical active ingredients and reactive oxygen species.

13. A photoinduced thermochromic or thermoluminescent free-standing film comprising the photoinduced thermochromic or thermoluminescent composition as defined in claim 1; one or more polymers; and optionally one or more excipients.

14. A photoinduced thermochromic or thermoluminescent article comprising the composition as defined in claim 1; or alternatively a free-standing film comprising the photoinduced thermochromic or thermoluminescent composition as defined in claim 1; one or more polymers; and optionally one or more excipients.

15. An article comprising the compositions as defined in claim 1; or alternatively a free-standing film comprising the photoinduced thermochromic or thermoluminescent composition as defined in claim 1; one or more polymers; and optionally one or more excipients, which is selected from the group consisting of:
(A) a photoinduced thermochromic or thermoluminescent coated article comprising:
a substrate; and
a photoinduced thermochromic or thermoluminescent coating deposited on the surface of the substrate, wherein the photoinduced thermochromic or thermoluminescent coating comprises the composition as defined in claim 1; and optionally one or more polymers;

(B) a photoinduced thermochromic or thermoluminescent embedded article comprising:
a porous substrate;
the photoinduced thermochromic or thermoluminescent composition as defined in claim 1 embedded in the porous substrate; and
optionally, one or more additional external coatings;
and (C) a photoinduced thermochromic or thermoluminescent free-standing film containing article, which comprises one or more photoinduced thermochromic or thermoluminescent free-standing film comprising the photoinduced thermochromic or thermoluminescent composition as defined in claim 1; one or more polymers; and optionally one or more excipients.

16. A method of applying a component to an optical material, the component comprising:
(1) photoinduced thermochromic or thermoluminescent composition, comprising:
a) nanoparticles capable of absorbing near-infrared radiation (NIR) and converting the NIR radiation into heat;
b) one or more phase change materials (PCM) selected from the group consisting of:
b1) a PCM capable of acting as chromic or fluorochromic promoter; and
b2) a PCM uncapable of acting as chromic or fluorochromic promoter;
c) one or more dyes selected from the group consisting of:
c1) a dye capable of modifying its colour or emission properties when the PCM changes between a solid state and a liquid state; and
c2) a dye uncapable of modifying its colour or emission on properties when the PCM between the solid state and the liquid state;
wherein:
when the PCM is uncapable of acting as chromic or fluorochromic promoter (b2), and the dye is uncapable of modifying its colour- or emission-properties when the PCM changes between the solid state and the liquid state (c2); then the photoinduced thermochromic or thermoluminescent composition further comprises one or more chromic or fluorochromic promoter selected from the group consisting of colour developers, emission quenchers, and emission activators;
or alternatively,
when at least the PCM is capable of acting as chromic or fluorochromic promoter (b1) or the dye is capable of modifying its colour or emission properties when the PCM changes between the solid state and the liquid state (c1); then the photoinduced thermochromic or thermoluminescent composition optionally comprises one or more chromic or fluorochromic promoter selected from the group consisting of colour developers, emission quenchers, and emission activators;
or alternatively the component comprises
(2) a photoinduced thermochromic or thermoluminescent free-standing film comprising the photoinduced thermochromic or thermoluminescent composition; one or more polymers; and
optionally one or more excipients;
or alternatively the component comprises
(3) a photoinduced thermochromic or thermoluminescent article comprising the photoinduced thermochromic or thermoluminescent composition; or the free-standing film, wherein the method comprises
applying the composition, the free-standing film, or the article to an optical material.

17. A method of producing an anti-counterfeit product with a component comprising:
1 a photoinduced thermochromic or thermoluminescent composition, comprising:
a) nanoparticles capable of absorbing near-infrared radiation (NIR) and converting the NIR radiation into heat;
b) one or more phase change materials (PCM) selected from the group consisting of:
b1) a PCM capable of acting as chromic or fluorochromic promoter; and
b2) a PCM uncapable of acting as chromic or fluorochromic promoter;
c) one or more dyes selected from the group consisting of:
c1) a dye capable of modifying its colour or emission properties when the PCM changes between a solid state and a liquid state; and
c2) a dye uncapable of modifying its colour or emission properties when the PCM between the solid state and the liquid state;
wherein:
when the PCM is uncapable of acting as chromic or fluorochromic promoter (b2), and the dye is uncapable of modifying its colour- or emission-properties when the PCM changes between the solid state and the liquid state (c2); then the photoinduced thermochromic or thermoluminescent composition further comprises one or more chromic or fluorochromic promoter selected from the group consisting of colour developers, emission quenchers, and emission activators;
or alternatively,
when at least the PCM is capable of acting as chromic or fluorochromic promoter (b1) or the dye is capable of modifying its colour- or emission-properties when the PCM changes between the solid state and the liquid state (c1); then the photoinduced thermochromic or thermoluminescent composition optionally comprises one or more chromic or fluorochromic promoter selected from the group consisting of colour developers, emission quenchers, and emission activators;
or alternatively the component comprises
(2) a photoinduced thermochromic or thermoluminescent free-standing film comprising the photoinduced thermochromic or thermoluminescent composition; one or more polymers; and
optionally one or more excipients;
or alternatively the component comprises
(3) a photoinduced thermochromic or thermoluminescent article comprising the photoinduced thermochromic or thermoluminescent composition; or the free-standing film, wherein the method comprises
labeling a product with the composition, the free-standing film, or the article.

\* \* \* \* \*